US012138978B2

(12) United States Patent
Furuta

(10) Patent No.: US 12,138,978 B2
(45) Date of Patent: Nov. 12, 2024

(54) VIBRATION DAMPING CONTROL APPARATUS AND DATA MANAGEMENT APPARATUS

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 572 days.

(21) Appl. No.: 17/468,874

(22) Filed: Sep. 8, 2021

(65) Prior Publication Data
US 2022/0105774 A1 Apr. 7, 2022

(30) Foreign Application Priority Data

Oct. 7, 2020 (JP) .................................. 2020-169553

(51) Int. Cl.
*B60G 17/0165* (2006.01)
*B60G 17/018* (2006.01)

(52) U.S. Cl.
CPC ....... *B60G 17/0165* (2013.01); *B60G 17/018* (2013.01); *B60G 2204/62* (2013.01); *B60G 2400/204* (2013.01); *B60G 2400/821* (2013.01); *B60G 2600/182* (2013.01); *B60G 2800/162* (2013.01)

(58) Field of Classification Search
CPC .............. B60G 17/0165; B60G 17/018; B60G 2204/62; B60G 2400/204; B60G 2400/821; B60G 2600/182; B60G 2800/162

USPC .......................................................... 701/40
See application file for complete search history.

(56) References Cited

U.S. PATENT DOCUMENTS

| | | | |
|---|---|---|---|
| 10,406,882 B2* | 9/2019 | Lakehal-Ayat | B60G 17/0182 |
| 2009/0076774 A1* | 3/2009 | Miyajima | G08G 1/0104 |
| | | | 702/179 |
| 2010/0138108 A1* | 6/2010 | Kajino | B60G 17/016 |
| | | | 701/38 |
| 2013/0054050 A1* | 2/2013 | Filev | B60W 50/0097 |
| | | | 701/2 |
| 2014/0195112 A1* | 7/2014 | Lu | B60G 17/015 |
| | | | 703/2 |
| 2017/0274724 A1* | 9/2017 | Liu | B60G 17/01933 |

(Continued)

FOREIGN PATENT DOCUMENTS

JP WO2020158314 A1 * 8/2020 ......... B60G 17/0165

*Primary Examiner* — Hung Q Nguyen
*Assistant Examiner* — Anthony Donald Taylor, Jr.
(74) *Attorney, Agent, or Firm* — Sughrue Mion, PLLC

(57) ABSTRACT

A vibration damping control apparatus for a vehicle executes preview vibration damping control while obtaining, from preview reference data, a road surface displacement related value relating to a vertical displacement of a road surface at a predicted passage position of a wheel of the vehicle. In the preview reference data, relationships are established among the road surface displacement related value obtained when a measurement vehicle actually traveled on the road surface, position information representing the position of a wheel of the measurement vehicle when the road surface displacement related value was obtained, and speed information representing the speed of the measurement vehicle when the road surface displacement related value was obtained or representing a speed range in which the speed of the measurement vehicle is contained.

7 Claims, 13 Drawing Sheets

(56) References Cited

U.S. PATENT DOCUMENTS

2018/0154723 A1* 6/2018 Anderson .............. H02K 11/33
2019/0079539 A1* 3/2019 Sridhar ................ G05D 1/0278
2019/0283520 A1* 9/2019 Furuta .................... B60G 17/06

* cited by examiner

PREVIEW REFERENCE DATA (43)

| POSITION INFORMATION(X,Y) (44a) | SPEED RANGE (44b) | UNSPRUNG DISPLACEMENT $z_1$ (44c) |
|---|---|---|
| (X1,Y1) | Vb1 | $z_1\_a$ |
| | Vb2 | $z_1\_b$ |
| | Vb3 | $z_1\_c$ |
| | Vb4 | $z_1\_d$ |
| (X2,Y2) | Vb1 | $z_1\_e$ |
| | Vb2 | $z_1\_f$ |
| | Vb3 | $z_1\_g$ |
| | Vb4 | $z_1\_h$ |
| (X3,Y3) | Vb1 | $z_1\_i$ |
| | Vb2 | $z_1\_j$ |
| | Vb3 | $z_1\_k$ |
| | Vb4 | $z_1\_l$ |
| ... | ... | ... |

FIG.3

| | PREVIEW REFERENCE DATA | | |
|---|---|---|---|
| | POSITION INFORMATION(X,Y) | SPEED RANGE | UNSPRUNG DISPLACEMENT $z_1$ |
| | ... | ... | ... |
| R1 | (X4,Y4) | Vb1 | $z_1\_i$ |
| | | Vb2 | |
| | | Vb3 | $z_1\_j$ |
| | | Vb4 | $z_1\_k$ |
| | (X5,Y5) | Vb1 | |
| | | Vb2 | $z_1\_l$ |
| | | Vb3 | $z_1\_m$ |
| | | Vb4 | |
| | (X6,Y6) | Vb1 | |
| | | Vb2 | |
| | | Vb3 | |
| | | Vb4 | $z_1\_n$ |
| | ... | ... | ... |

FIG.11

PREVIEW REFERENCE DATA — 43

| POSITION INFORMATION(X,Y) | SPEED | UNSPRUNG DISPLACEMENT $z_1$ |
|---|---|---|
| (X1,Y1) | ... | $z_{1\_a}$ |
| | Vs1 | $z_{1\_b}$ |
| | Vs2 | $z_{1\_c}$ |
| | ... | $z_{1\_d}$ |
| (X2,Y2) | ... | $z_{1\_e}$ |
| | Vs1 | $z_{1\_f}$ |
| | Vs2 | $z_{1\_g}$ |
| | ... | $z_{1\_h}$ |
| ... | ... | ... |

VIBRATION DAMPING CONTROL APPARATUS AND DATA MANAGEMENT APPARATUS

BACKGROUND OF THE INVENTION

Field of the Invention

The present disclosure relates to a vibration damping control apparatus for a vehicle and to a data management apparatus.

Description of the Related Art

Conventionally, there has been proposed an apparatus which controls actuators provided for wheels of a vehicle by using a piece of information relating to the vertical displacement of a road surface that the wheels of the vehicle are predicted to pass (road surface displacement), thereby performing control for suppressing vibrations of a sprung portion of the vehicle (see, for example, US Patent Application Publication No. 2018/154723). Such control is also called "preview vibration damping control."

Incidentally, the present inventor has studied an apparatus which collects values that relate to road surface displacements and are obtained when a measurement vehicle actually traveled on a road surface (hereinafter referred to as a "road surface displacement related value") and executes the preview vibration damping control by using the collected road surface displacement related value (hereinafter, such an apparatus will be referred to as a "vibration damping control apparatus").

However, the vibration damping control apparatus has the following problems. The frequency band (hereinafter referred to as the "first frequency band") of vibrations generated in the measurement vehicle when the measurement vehicle traveled on a certain road at a speed Vsa differs from the frequency band (hereinafter referred to as the "second frequency band") of vibrations generated in the measurement vehicle when the measurement vehicle traveled on the same road at a speed Vsb. Namely, the frequency band of vibrations represented by a time series change of the road surface displacement related value obtained when the measurement vehicle traveled at the speed Vsa is the first frequency band, and the frequency band of vibrations represented by a time series change of the road surface displacement related value obtained when the measurement vehicle traveled at the speed Vsb is the second frequency band. Here, it is assumed that the speed Vsb is higher than the speed Vsa, and the difference between the speed Vsb and the speed Vsa is relatively large. It is assumed that the first frequency band ranges from a frequency fa_low to a frequency fa_high (>fa_low), and the second frequency band ranges from a frequency fb_low to a frequency fb_high (>fb_low). In general, the frequency fb_high is lower than the frequency fa_high, and the frequency fb_low is lower than the frequency fa_low. Accordingly, the first frequency band contains a frequency band which is not contained in the second frequency band (for example, a frequency band from the frequency fb_high to the frequency fa_high). Furthermore, the larger the difference between the speed Vsb and the speed Vsa, the larger the difference between the frequency fb_high and the frequency fa_high.

In other words, the frequency band of vibrations that can be suppressed by the preview vibration damping control when the vehicle is traveling at the speed Vsa is the first frequency band. The frequency band of vibrations that can be suppressed by the preview vibration damping control when the vehicle is traveling at the speed Vsb is the second frequency band.

Accordingly, in the case where the speed of the measurement vehicle when the road surface displacement related value was obtained differs from the speed of a vehicle when the preview vibration damping control is executed in the vehicle, the following problem occurs. For example, it is assumed that, in a state in which the vehicle is traveling at the speed Vsb, the vibration damping control apparatus executes the preview vibration damping control by using the road surface displacement related value obtained when the measurement vehicle traveled at the speed Vsa. In this case, the frequency band of vibrations that can be suppressed by the preview vibration damping control is the second frequency band (the frequency band from the frequency fb_low to the frequency fb_high). Meanwhile, the frequency band of vibrations represented by a time series change of the road surface displacement related value is the first frequency band. The vibration damping control apparatus uselessly drives an actuator so as to suppress vibrations in the frequency band which is not contained in the second frequency band (the frequency band from the frequency fb_high to the frequency fa_high). Accordingly, vibrations of a sprung portion of the vehicle may increase.

There is assumed another example case where, in a state in which the vehicle is traveling at the speed Vsa, the vibration damping control apparatus executes the preview vibration damping control by using the road surface displacement related value obtained when the measurement vehicle traveled at the speed Vsb. In this case, the frequency band of vibrations represented by a time series change of the road surface displacement related value does not contain the frequency band from the frequency fb_high to the frequency fa_high. The vibration damping control apparatus cannot suppress vibrations in the frequency band ranging from the frequency fb_high to the frequency fa_high. Accordingly, the effect of suppressing vibrations of the sprung portion may lower.

SUMMARY OF THE INVENTION

The present disclosure provides a technique which enables execution of preview vibration damping control by using a road surface displacement related value suitable for the speed of a vehicle.

The present disclosure provides a vibration damping control apparatus for a vehicle (10). The vibration damping control apparatus comprises a speed obtainment section (32, 33), a control force generating apparatus (17), and a control unit (30).

The speed obtainment section is configured to obtain information regarding speed of the vehicle.

The control force generating apparatus is configured to generate control force in a vertical direction for damping vibration of a sprung portion of the vehicle, the control force being applied between at least one wheel and a portion of a body of the vehicle, which portion corresponds to the position of the wheel.

The control unit is configured to determine a predicted passage position that the wheel is predicted to pass after elapse of a predetermined time from a present point in time, to obtain, from preview reference data (43), as preview information, a road surface displacement related value relating to displacement of a road surface in the vertical direction at the predicted passage position, and to execute preview vibration damping control for controlling the control force generating apparatus in such a manner that, at a point in time when the wheel passes the predicted passage position, the control force (Fc) coincides with a target control force (Fct) which is a target value of the control force computed by using the preview information.

In the preview reference data, relationships are established among the road surface displacement related value ($44c$) obtained when a measurement vehicle actually traveled on the road surface, position information ($44a$) representing the position of a wheel of the measurement vehicle when the road surface displacement related value was obtained, and speed information ($44b$ or $44b'$) representing speed of the measurement vehicle when the road surface displacement related value was obtained or representing a speed range in which the speed of the measurement vehicle is contained.

The control unit is configured to obtain, as the preview information, at least a first road surface displacement related value which is the road surface displacement related value related to the speed information corresponding to the speed of the vehicle.

By virtue of the above-described configuration, the vibration damping control apparatus can execute the preview vibration damping control while obtaining road surface displacement information suitable for the speed of the vehicle from the preview reference data. It is possible to reduce the possibility that an effect of suppressing the vibration of the sprung portion lowers or the vibration of the sprung portion increases.

The control unit may be configured to obtain, as the preview information, a second road surface displacement related value in addition to the first road surface displacement related value. The second road surface displacement related value is the road surface displacement related value related to the speed information ($44b\_clst$) which is other than the speed information corresponding to the speed of the vehicle which is the closest to the speed of the vehicle.

The control unit may be configured to determine whether or not a predetermined condition is satisfied, the predetermined condition being that the road surface displacement related value related to the speed information corresponding to the speed of the vehicle is present in the preview reference data, to obtain, as the preview information, the first road surface displacement related value when the predetermined condition is satisfied, and to obtain, as the preview information, the second road surface displacement related value when the predetermined condition is not satisfied.

By virtue of the above-described configuration, even when the road surface displacement related value related to the speed information corresponding to the speed of the vehicle is not present in the preview reference data, the vibration damping control apparatus can execute the preview vibration damping control by obtaining the second road surface displacement related value. Since the second road surface displacement related value is the road surface displacement related value related to the speed information representing a speed or a speed range which is the closest to the speed of the vehicle, it is possible to reduce the possibility that the effect of suppressing the vibration of the sprung portion lowers or the vibration of the sprung portion increases.

The control unit may be configured to obtain, as the second road surface displacement related value,
the road surface displacement related value ($z_1\_c3$) related to the speed information which is other than the speed information corresponding to the speed of the vehicle which is lower than and is the closest to the speed of the vehicle, and the road surface displacement related value ($z_1\_c4$) related to the speed information which is other than the speed information corresponding to the speed of the vehicle which is higher than and is the closest to the speed of the vehicle.

The vibration damping control apparatus may further comprise an information obtaining apparatus (34, 35, 36, 30) which obtains the road surface displacement related value while the vehicle is traveling. In this case, the target control force includes a first target control force (F1) and a second target control force (F2). The first target control force is control force computed by using the preview information. The second target control force includes at least one of feedback control force ($F2\_b$) for damping vibration of the sprung portion and control force ($F2\_a$, $F2\_c$) computed by using the road surface displacement related value obtained by the information obtaining apparatus and representing displacement of the road surface ahead of the wheel of the vehicle.

In this case, the control unit is configured to determine whether or not a predetermined condition is satisfied, the predetermined condition being that the road surface displacement related value related to the speed information corresponding to the speed of the vehicle is present in the preview reference data, and to change either or both of a gain ($G_1$) for the first target control force (F1) and a gain ($G_2$) for the second target control force (F2) in accordance with the result of the determination as to whether or not the predetermined condition is satisfied.

By virtue of the above-described configuration, the vibration damping control apparatus can suppress the vibration of the sprung portion by changing the magnitude of the first target control force and/or the magnitude of the second target control force, depending on whether or not the road surface displacement related value related to the speed information corresponding to the speed of the vehicle is present in the preview reference data.

The road surface displacement related value may include at least one of a road surface displacement ($z_0$) representing the displacement of the road surface in the vertical direction, a road surface displacement speed ($dz_0$) representing a derivative value of the road surface displacement with respect to time, an unsprung displacement ($z_1$) representing displacement of an unsprung portion of the vehicle in the vertical direction, and an unsprung speed ($dz_1$) representing a derivative value of the unsprung displacement with respect to time.

The present disclosure provides a data management apparatus. The data management apparatus comprises a storage device (42) for storing preview reference data (43) which is used when a vehicle (10) executes preview vibration damping control, and a data processing apparatus (41, 45).

In the preview reference data, relationships are established among a road surface displacement related value ($44c$) which is a piece of information obtained when a measurement vehicle actually traveled on a road surface and relating to displacement of the road surface in a vertical direction, position information ($44a$) representing the position of a wheel of the measurement vehicle when the road surface displacement related value was obtained, and speed information ($44b$ or $44b'$) representing speed of the measurement vehicle when the road surface displacement related value was obtained or representing a speed range in which the speed of the measurement vehicle is contained.

The data processing apparatus is configured to supply the preview reference data to the vehicle in response to a request from the vehicle.

By virtue of the above-described configuration, the road surface displacement related values are managed according to the speed information in the preview reference data. The data management apparatus can provide to the vehicle the road surface displacement related value suitable for the speed of the vehicle.

The control unit may be realized by a microprocessor programed in order to execute one or more functions described in the present specification. The control unit may be entirely or partially realized by hardware composed of, for example, ASIC; i.e., an integrated circuit dedicated to one or more applications.

In the above description, constituent elements corresponding to those of embodiments which will be described later are accompanied by parenthesized names and/or symbols which are used in the embodiments; however, the constituent elements are not limited to those in the embodiments defined by the names and/or the symbols. Other objects, other features, and attendant advantages of the present disclosure will be readily appreciated from the following description of the embodiments which is made with reference to the accompanying drawings.

BRIEF DESCRIPTION OF THE DRAWINGS

FIG. 3 shows an example of preview reference data;

FIG. 11 shows another example of the preview reference data;

FIG. 13 shows still another example of the preview reference data.

DESCRIPTION OF THE PREFERRED EMBODIMENTS

First Embodiment (Configuration of Vibration Damping Control Apparatus)

Figure 1:
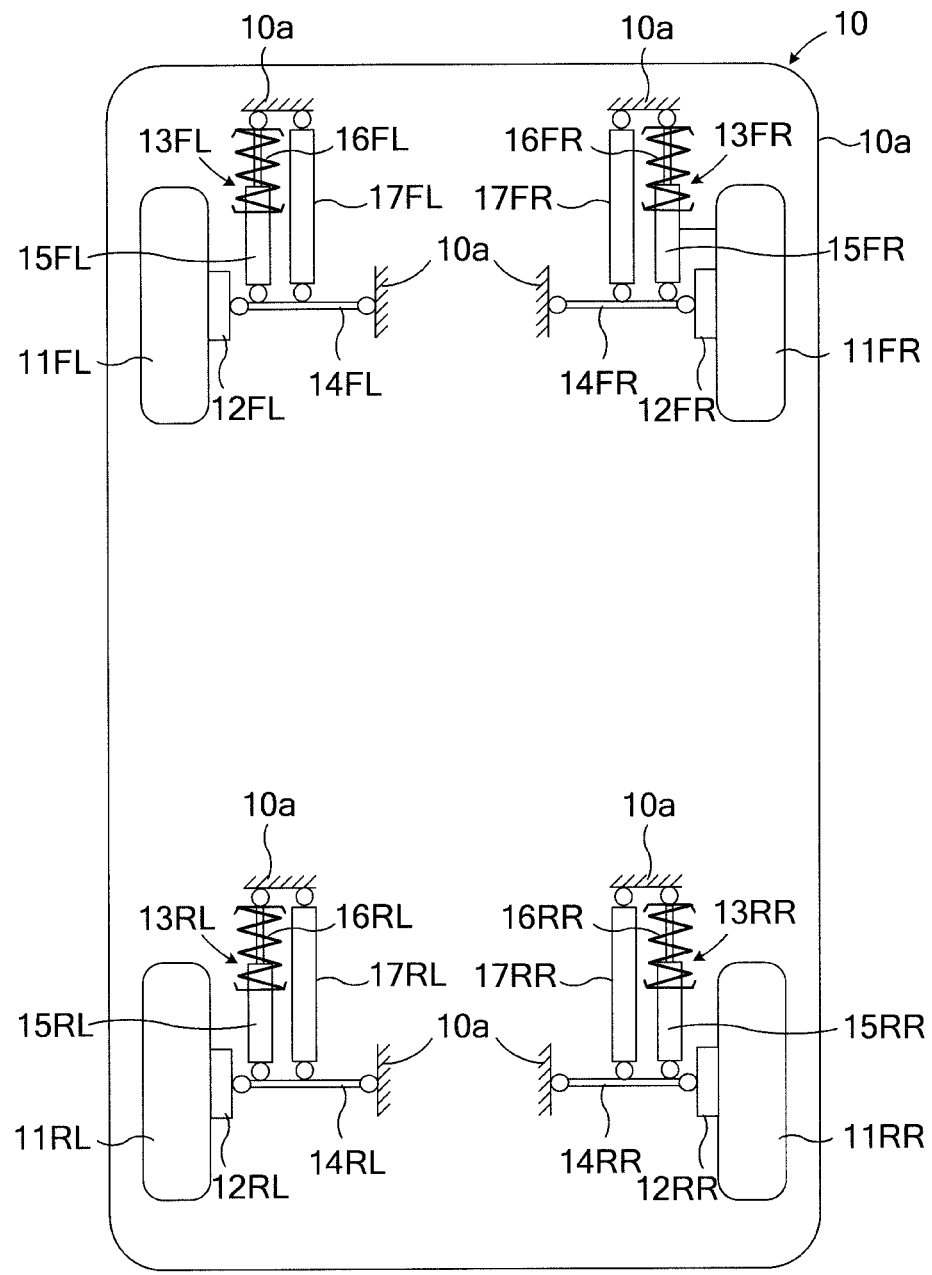
FIG. 1 is a schematic diagram of a vehicle to which a vibration damping control apparatus according to a first embodiment is applied.
Figure 2:
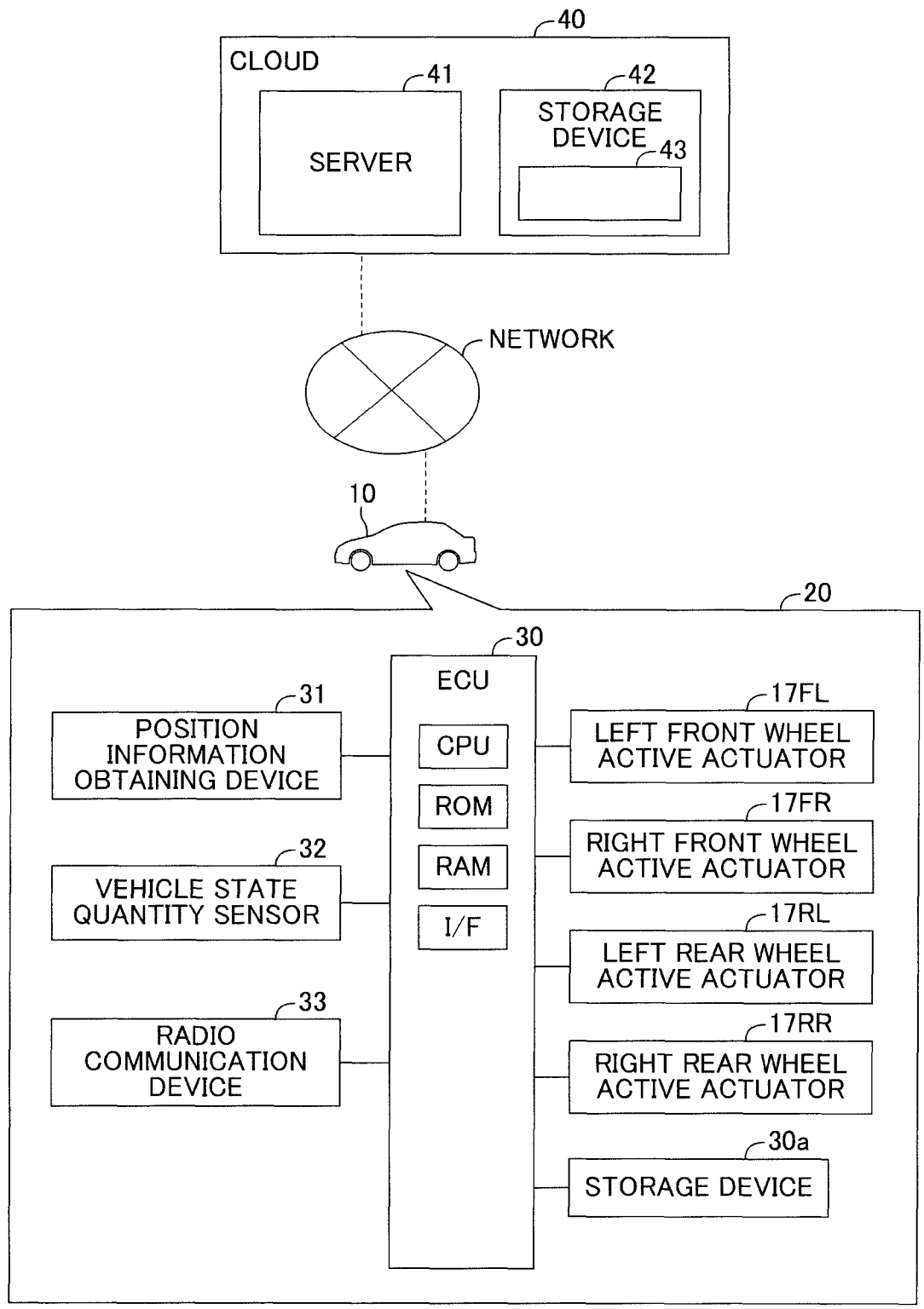
FIG. 2 is a schematic diagram of the vibration damping control apparatus according to the first embodiment.

A vibration damping control apparatus according to the first embodiment is applied to a vehicle 10 shown in FIG. 1. As shown in FIG. 2, hereinafter, this vibration damping control apparatus is referred to also as the "vibration damping control apparatus 20."

As shown in FIG. 1, the vehicle 10 includes a left front wheel 11FL, a right front wheel 11FR, a left rear wheel 11RL, and a right rear wheel 11RR. The left front wheel 11FL is rotatably supported by a body 10a via a wheel support member 12FL. The right front wheel 11FR is rotatably supported by the body 10a via a wheel support member 12FR. The left rear wheel 11RL is rotatably supported by the body 10a via a wheel support member 12RL. The right rear wheel 11RR is rotatably supported by the body 10a via a wheel support member 12RR.

Notably, the left front wheel 11FL, the right front wheel 11FR, the left rear wheel 11RL, and the right rear wheel 11RR will be referred to as the "wheel(s) 11" in the case where these wheels are not required to be distinguished from one another. Similarly, the left front wheel 11FL and the right front wheel 11FR will be referred to as the "front wheel(s) 11F." Similarly, the left rear wheel 11RL and the right rear wheel 11RR will be referred to as the "rear wheel(s) 11R." The wheel support members 12FL to 12RR will be referred to as the "wheel support member(s) 12."

The vehicle 10 further includes a left front wheel suspension 13FL, a right front wheel suspension 13FR, a left rear wheel suspension 13RL, and a right rear wheel suspension 13RR. These suspensions 13FL to 13RR will now be described in detail. These suspensions 13FL to 13RR are independent-type suspensions. However, the suspensions 13FL to 13RR may be suspensions of a different type.

The left front wheel suspension 13FL suspends the left front wheel 11FL from the body 10a and includes a suspension arm 14FL, a shock absorber 15FL, and a suspension spring 16FL. The right front wheel suspension 13FR suspends the right front wheel 11FR from the body 10a and includes a suspension arm 14FR, a shock absorber 15FR, and a suspension spring 16FR.

The left rear wheel suspension 13RL suspends the left rear wheel 11RL from the body 10a and includes a suspension arm 14RL, a shock absorber 15RL, and a suspension spring 16RL. The right rear wheel suspension 13RR suspends the right rear wheel 11RR from the body 10a and includes a suspension arm 14RR, a shock absorber 15RR, and a suspension spring 16RR.

Notably, the left front wheel suspension 13FL, the right front wheel suspension 13FR, the left rear wheel suspension 13RL, and the right rear wheel suspension 13RR will be referred to as the "suspension(s) 13" in the case where these suspensions are not required to be distinguished from one another. Similarly, the suspension arms 14FL to 14RR will be referred to as the "suspension arm(s) 14." Similarly, the shock absorbers 15FL to 15RR will be referred to as the "shock absorber(s) 15." Similarly, the suspension springs 16FL to 16RR will be referred to as the "suspension spring (s) 16."

The suspension arm 14 connects the wheel support member 12 to the body 10a. In FIG. 1, a single suspension arm 14 is provided for each suspension 13. In a different example, a plurality of suspension arms 14 may be provided for each suspension 13.

The shock absorber 15 is disposed between the body 10a and the suspension arm 14. The upper end of the shock absorber 15 is connected to the body 10a, and the lower end of the shock absorber 15 is connected to the suspension arm 14. The suspension spring 16 is disposed between the body 10a and the suspension arm 14 via the shock absorber 15. Namely, the upper end of the suspension spring 16 is connected to the body 10a, and the lower end of the suspension spring 16 is connected to the cylinder of the shock absorber 15. Notably, in the case where the suspension spring 16 and the shock absorber 15 are disposed in series as described above, the upper end of the shock absorber 15 may be connected to the body 10a, and the lower end of the shock absorber 15 may be connected to the wheel support member 12.

In the present example, the shock absorber 15 is of a damping force fixed type. In a different example, the shock absorber 15 may be of a damping force adjustable type. Furthermore, the suspension spring 16 may be provided between the body 10a and the suspension arm 14 without intermediation of the shock absorber 15. Specifically, the upper end of the suspension spring 16 may be connected to the body 10a, and the lower end of the suspension spring 16 may be connected to the suspension arm 14. Notably, in the case where the suspension spring 16 and the shock absorber 15 are disposed in parallel as described above, the suspension spring 16 and the shock absorber 15 may be disposed in parallel between the body 10a and the wheel support member 12.

Figure 4:
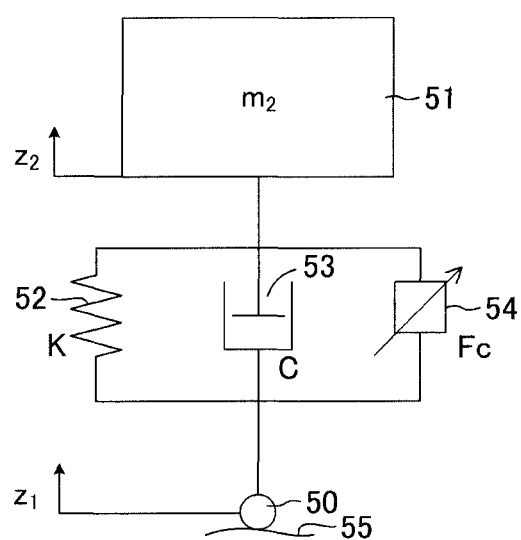
FIG. 4 is a view showing a single wheel model of the vehicle.

Of members including the wheel 11, the shock absorber 15, etc., portions located on the wheel 11 side of the suspension spring 16 will be collectively referred to as an "unsprung portion 50" or an "unsprung member 50" (see FIG. 4). On the other hand, of the members including the body 10a, the shock absorber 15, etc., portions located on the body 10a side of the suspension spring 16 will be collectively referred to as a "sprung portion 51" or a "sprung member 51" (see FIG. 4).

Furthermore, a left front wheel active actuator 17FL, a right front wheel active actuator 17FR, a left rear wheel active actuator 17RL, and a right rear wheel active actuator 17RR are provided between the body 10a and the suspension arms 14FL to 14RR, respectively. These active actuators 17FL to 17RR are disposed in parallel with the shock absorbers 15FL to 15RR and the suspension springs 16FL to 16RR, respectively.

Notably, the left front wheel active actuator 17FL, the right front wheel active actuator 17FR, the left rear wheel active actuator 17RL, and the right rear wheel active actuator 17RR will be referred to as the "active actuator(s) 17" in the case where these active actuators are not required to be distinguished from one another. Similarly, the left front wheel active actuator 17FL and the right front wheel active actuator 17FR will be referred to as the "front wheel active actuator(s) 17F." Similarly, the left rear wheel active actuator 17RL and the right rear wheel active actuator 17RR will be referred to as the "rear wheel active actuator(s) 17R."

The active actuator 17 generates a control force Fc on the basis of a control instruction from an electronic controller 30 shown in FIG. 2. The control force Fc is a force in the vertical direction which acts between the body 10a and the wheel 11 (namely, between the sprung portion 51 and the unsprung portion 50) so as to damp vibrations of the sprung portion 51. Notably, the electronic controller 30 will be referred to as the "ECU 30" and may be referred to as the "control unit" or the "controller." Furthermore, the active actuator 17 may be referred to as the "control force generating apparatus." The active actuator 17 is an electromagnetic active actuator. The active actuator 17 constitutes an active suspension in cooperation with the shock absorber 15, the suspension spring 16, etc.

As shown in FIG. 2, the vibration damping control apparatus 20 includes the above-mentioned ECU 30, a storage device 30a, a position information obtaining device 31, a vehicle state quantity sensor 32, and a radio communication device 33. Furthermore, the vibration damping control apparatus 20 includes the above-described active actuators 17FL to 17RR.

The ECU 30 includes a microcomputer. The microcomputer includes a CPU, a ROM, a RAM, an interface (I/F), etc. The CPU realizes various functions by executing instructions (programs, routines) stored in the ROM.

The ECU 30 is connected to the storage device 30a, which is a nonvolatile storage device into which information can be written and from which information can be read. In the present example, the storage device 30a is a hard disk drive. The ECU 30 can store information in the storage device 30a and can read out the information stored in the storage device 30a. Notably, the storage device 30a is not limited to the hard disk drive and may be a well known storage device or storage medium into which information can be written and from which information can be read.

The ECU 30 is connected to the position information obtaining device 31, the vehicle state quantity sensor 32, and the radio communication device 33.

The position information obtaining device 31 includes a GNSS (Global Navigation Satellite System) receiver and a map database. The GNSS receiver receives from satellites signals (for example, GNSS signals) for detecting the position of the vehicle 10. The map database stores map information. The position information obtaining device 31 determines the current position (for example, latitude and longitude) of the vehicle 10 on the basis of the GNSS signals and outputs a signal representing the determined position. The position information obtaining device 31 is, for example, a navigation device.

Notably, the position information obtaining device 31 may detect the shape of a road and a group of characteristic points of structures, etc. by using, for example, a LiDAR and a camera sensor (not shown) provided on the vehicle 10 and determine the current position of the vehicle 10 on the basis of a three-dimensional map containing information of the point group (see, for example, Japanese Patent Application Laid-Open (kokai) No. 2020-16541).

The GNSS signals contain information regarding moving speed. Accordingly, the ECU 30 obtains the vehicle speed Vs of the vehicle 10 at the present point in time on the basis of the GNSS signals. Furthermore, the ECU 30 obtains the heading direction Td of the vehicle 10 on the basis of the record of the position of the vehicle 10 obtained by the position information obtaining device 31.

The vehicle state quantity sensor 32 includes a plurality of types of sensors for detecting the condition of the vehicle 10 (the speed, acceleration, direction, etc. of the vehicle 10). The vehicle state quantity sensor 32 includes a vehicle speed sensor for detecting the vehicle speed Vs, a plurality of wheel speed sensors for detecting the wheel speeds of the wheels 11, a longitudinal acceleration sensor for detecting the acceleration of the vehicle 10 in the longitudinal direction, a lateral acceleration sensor for detecting the acceleration of the vehicle 10 in the lateral direction, a yaw rate sensor for detecting the yaw rate of the vehicle 10. Notably, the ECU 30 may compute the vehicle speed Vs on the basis of signals from the wheel speed sensors.

The radio communication device 33 is a radio communication terminal which communicates with a cloud (data management apparatus) 40 through a network for information transfer therebetween. The cloud 40 includes a server 41 and at least one storage device 42, which are connected to the network.

The server 41 includes a CPU, a ROM, a RAM, an interface (I/F), etc. The storage device 42 stores preview reference data 43. The server 41 searches and reads data stored in the storage device 42 and writes data into the storage device 42. Furthermore, in response to a request from the vibration damping control apparatus 20 (the ECU 30), the server 41 provides the preview reference data 43 stored in the storage device 42 to the vehicle 10 via the network.

The preview reference data 43 is used when the vehicle 10 executes preview vibration damping control, which will be described later. The preview reference data 43 includes a road surface displacement related value, position information, and speed information, which are related to one another. The road surface displacement related value was obtained when a measurement vehicle, which will be described later, actually traveled on a road surface. The position information represents the position of a wheel of the measurement vehicle at the time when the road surface displacement related value was obtained. The speed information represents a speed range which contains the speed of the measurement vehicle at the time when the road surface displacement related value was obtained.

The road surface displacement related value is a value relating to displacement of a road surface in the vertical direction. Specifically, the road surface displacement related value includes at least one of a road surface displacement $z_0$ representing the displacement of the road surface in the vertical direction, a road surface displacement speed $dz_0$ representing the derivative value of the road surface displacement $z_0$ with respect to time, an unsprung displacement $z_1$ representing displacement of the unsprung portion 50 in the vertical direction, and an unsprung speed $dz_1$ representing the derivative value of the unsprung displacement $z_1$ with respect to time. In the present example, the road surface displacement related value is the unsprung displacement $z_1$. When the vehicle 10 travels on a road surface, the unsprung portion 50 displaces in the vertical direction with the displacement of the road surface. The unsprung displacement $z_1$ is the displacement of the unsprung portion 50 in the vertical direction corresponding to the position of each wheel 11 of the vehicle 10.

As shown in FIG. 3, the preview reference data 43 includes a table 44 in which position information 44a, speed ranges 44b, and unsprung displacements ($z_1$) 44c are related to one another.

The position information 44a represents a position (for example, latitude and longitude) on a road surface. The position information 44a represents the position on the road surface by two-dimensional (X, Y) coordinates. In FIG. 3, "X1, Y1," "X2, Y2," and "X3, Y3" are shown as examples of the position information.

The speed ranges 44b are pieces of information representing ranges of the vehicle speed Vs (speed zones). In the present example, a possible range Vra of the vehicle speed Vs (namely, a range between zero and a rated maximum vehicle speed Vmax) is divided into four ranges Vb1 to Vb4.

The first range Vb1 represents a range of speed equal to or higher than zero and lower than a first speed Vs1. The second range Vb2 represents a range of speed equal to or higher than the first speed Vs1 and lower than second speed Vs2. The third range Vb3 represents a range of speed equal to or higher than the second speed Vs2 and lower than a third speed Vs3. The fourth range Vb4 represents a range of speed equal to or higher than the third speed Vs3 and not higher than the maximum vehicle speed Vmax. Notably, the first speed Vs1, the second speed Vs2, the third speed Vs3, and the maximum vehicle speed Vmax satisfy a relation of Vs1<Vs2<Vs3<Vmax.

In the present example, the range Vra of the vehicle speed Vs is divided into the four ranges Vb1 to Vb4. However, the number of ranges is not limited to four. For example, in one or more embodiments, the range Vra of the vehicle speed Vs may be divided into five or more ranges.

Each of the unsprung displacements ($z_1$) 44c is an unsprung displacement $z_1$ obtained when the measurement vehicle actually traveled on the road surface (=the position information 44a). A method for obtaining the unsprung displacements $z_1$ will be described later. The unsprung displacements ($z_1$) 44c are stored for each of the speed ranges Vb1 to Vb4.

Referring back to FIG. 2, the ECU 30 is connected to the left front wheel active actuator 17FL, the right front wheel active actuator 17FR, the left rear wheel active actuator 17RL, and the right rear wheel active actuator 17RR via a drive circuit (not shown).

The ECU 30 computes a target control force Fct for each active actuator 17. The target control force Fct is control force for the preview vibration damping control; namely, control force for damping vibrations of the sprung portion 51 of the wheel 11. The ECU 30 controls the active actuator 17 in such a manner that, at a point in time when the wheel 11 passes a predicted passage position which will be described later, the active actuator 17 generates a control force Fc corresponding to (equal to) the target control force Fct.

(Outline of Basic Preview Vibration Damping Control)

Now, the outline of basic preview vibration damping control executed by the vibration damping control apparatus 20 will be described. FIG. 4 shows a single wheel model of the vehicle 10 on a road surface 55.

A spring 52 corresponds to the suspension spring 16, a damper 53 corresponds to the shock absorber 15, and an actuator 54 corresponds to the active actuator 17.

In FIG. 4, the mass of the sprung portion 51 is labeled as sprung mass $m_2$. As described above, $z_1$ represents displacement of the unsprung portion 50 in the vertical direction (unsprung displacement). Displacement of the sprung portion 51 in the vertical direction will be referred to as sprung displacement $z_2$. The sprung displacement $z_2$ is the vertical displacement of the sprung portion 51 corresponding to the position of each wheel 11. The spring constant (equivalent spring constant) of the spring 52 is labeled as spring constant K. The damping coefficient (equivalent damping coefficient) of the damper 53 is labeled as damping coefficient C. The force generated by the actuator 54 is labeled as control force Fc.

Furthermore, the derivative values of $z_1$ and $z_2$ with respect to time are denoted by $dz_1$ and $dz_2$, respectively, and the second-order derivative values of $z_1$ and $z_2$ with respect to time are denoted by $ddz_1$ and $ddz_2$, respectively. In the following description, it is prescribed that $z_1$ and $z_2$ assume positive values for upward displacements, and, for forces generated by the spring 52, the damper 53, the actuator 54, etc., upward is positive.

In the single wheel model of the vehicle 10 shown in FIG. 4, the equation of motion for the motion of the sprung portion 51 in the vertical direction can be represented by expression (1).

$$m_2 ddz_2 = C(dz_1 - dz_2) + K(z_1 - z_2) - Fc \qquad (1)$$

The damping coefficient C in expression (1) is assumed to be constant. However, since the actual damping coefficient changes with the stroke speed of the suspension 13, the damping coefficient C may be set to, for example, a value which changes with the derivative value of the stroke H with respect to time.

Furthermore, in the case where the vibration of the sprung portion 51 is completely cancelled out by the control force Fc (namely, in the case where all the sprung acceleration $ddz_2$, the sprung speed $dz_2$ and the sprung displacement $z_2$ become zero), the control force Fc is represented by expression (2).

$$Fc = Cdz_1 + Kz_1 \tag{2}$$

Accordingly, the control force Fc for damping the vibration of the sprung portion 51 can be represented by expression (3), where α is a control gain. Notably, the control gain α is an arbitrary constant which is greater than 0 and not greater than 1.

$$Fc = \alpha(Cdz_1 + Kz_1) \tag{3}$$

When expression (3) is applied to expression (1), expression (1) can be represented by the following expression (4).

$$m_2 ddz_2 = C(dz_1 - dz_2) + K(z_1 - z_2) - \alpha(Cdz_1 + Kz_1) \tag{4}$$

When this expression (4) is subjected to Laplace transformation and is arranged, the following expression (5) is obtained. Namely, the transfer function from the unsprung displacement $z_1$ to the sprung displacement $z_2$ is represented by expression (5). Notably, "s" in expression (5) is a Laplacian operator.

$$\frac{z_2}{z_1} = \frac{(1-\alpha)(Cs + K)}{m_2 s^2 + Cs + K} \tag{5}$$

According to expression (5), the transfer function changes with the control gain α. Expression (5) shows that when the control gain α is an arbitrary constant which is greater than 0 and not greater than 1, the magnitude of the transfer function certainly becomes smaller than "1" (namely, the vibration of the sprung portion 51 can be reduced). Furthermore, expression (5) shows that when the control gain α is 1, since the magnitude of the transfer function becomes "0," the vibration of the sprung portion 51 is completely cancelled out. On the basis of expression (3), the target control force Fct is computed in accordance with the following expression (6). The target control force Fct is a target control force for damping the vibration of the sprung portion generated when the wheel 11 passes the predicted passage position. Notably, the gain $\beta_1$ in expression (6) corresponds to αC, and the gain $\beta_2$ in expression (6) corresponds to αK.

$$Fct = \beta_1 \times dz_1 + \beta_2 \times z_1 \tag{6}$$

As described above, the ECU 30 previously obtains (reads ahead) the unsprung displacement $z_1$ at a position (predicted passage position) which the wheel 11 passes in the future, and applies the obtained unsprung displacement $z_1$ to expression (6), thereby computing the target control force Fct. Notably, since the term of the unsprung displacement $z_1$ and the term of the unsprung speed $dz_1$ on the right side of expression (6) are target control forces for damping the vibration of the sprung portion generated when the wheel 11 passes the predicted passage position, they can be said to be "target control forces for feedforward control."

The ECU 30 causes the actuator 54 to generate a control force Fc corresponding to the target control force Fct at a timing when the wheel 11 passes the predicted passage position (namely, a timing when the unsprung displacement $z_1$ applied to expression (6) occurs). As a result, the vibration of the sprung portion 51 can be reduced when the wheel 11 passes the predicted passage position (namely, when the unsprung displacement $z_1$ applied to expression (6) occurs).

Notably, the ECU 30 may compute the target control force Fct in accordance with the following expression (7) which is obtained by omitting the differential term ($\beta_1 \times dz_1$) from expression (6). In this case as well, the ECU 30 can cause the actuator 54 to generate the control force Fc for reducing the vibration of the sprung portion 51. Accordingly, as compared with the case where the control force Fc is not generated, the vibration of the sprung portion 51 can be reduced.

$$Fct = \beta_2 \times z_1 \tag{7}$$

The control for damping the vibration of the sprung portion 51 as described above will be referred to as "preview vibration damping control."

Notably, in the above-described single wheel model, the mass of the unsprung portion 50 and elastic deformation of a tire are ignored, and it is assumed that the unsprung displacement $z_1$ and the road surface displacement $z_0$ representing the displacement of the road surface 55 in the vertical direction are the same. In different examples, similar preview vibration damping control may be executed by using the road surface displacement $z_0$ and/or the road surface displacement speed $dz_0$ in place of or in addition to the unsprung displacement $z_1$ and the unsprung speed $dz_1$.

(Outline of Preview Vibration Damping Control for Front Wheels and Rear Wheels)

Next, the outline of the preview vibration damping control will be described for the front wheels and the rear wheels, respectively, with reference to FIGS. 5 to 7. In the following description, for the "target control force Fct" and the "control force Fc," a suffix "_f" represents that the target control force Fct and the control force Fc are those for the front wheel 11F, and a suffix "_r" represents that the target control force Fct and the control force Fc are those for the rear wheel 11R.

Figure 5:
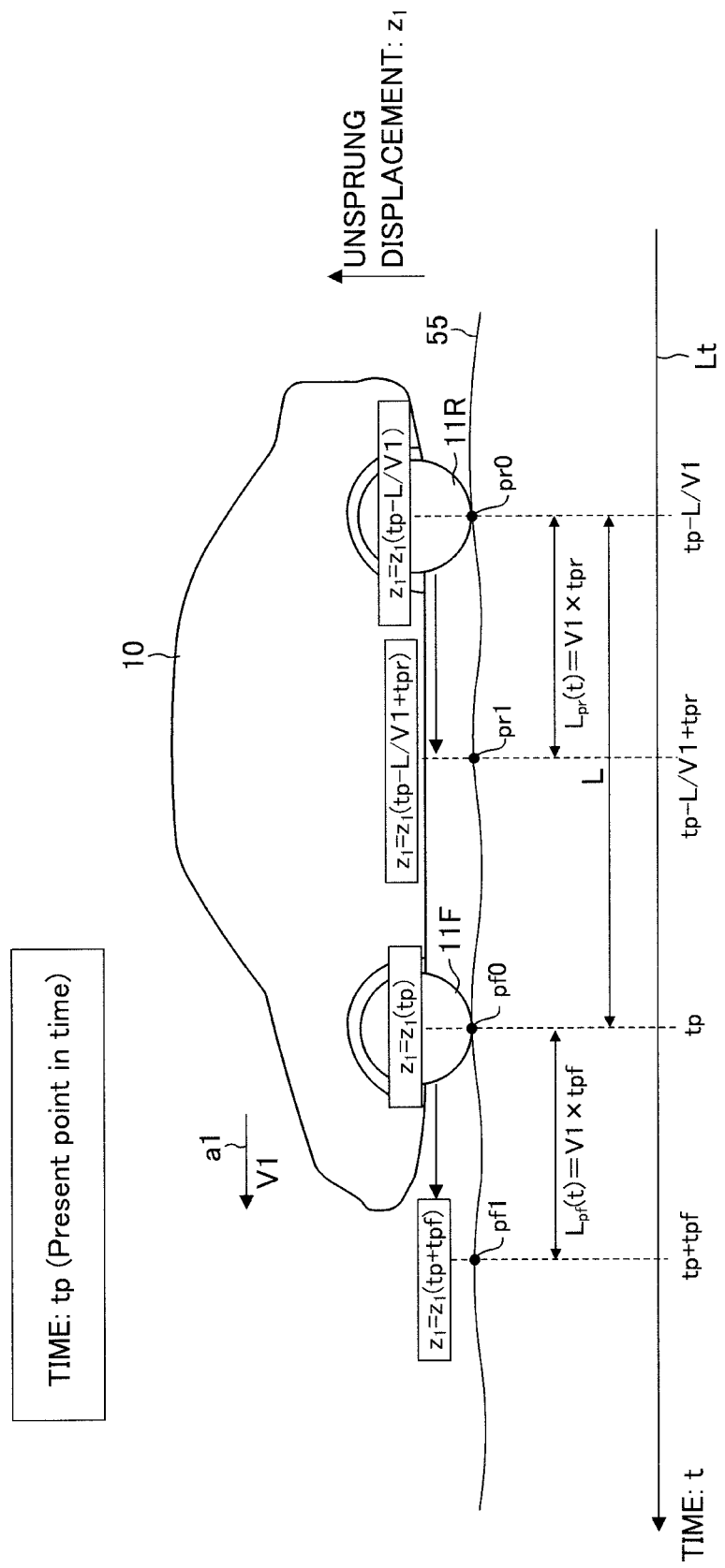
FIG. 5 is a chart used for describing preview vibration damping control.

FIG. 5 shows the vehicle 10 which is traveling at a speed V1 in a direction indicated by an arrow a1 at the present point in time tp. Notably, in the following description, the front wheel 11F and the rear wheel 11R are wheels on the left side or the right side, and the moving speeds of the front wheel 11F and the rear wheel 11R are considered to be the same as the speed V1.

In FIG. 5, a line Lt is a virtual time axis t. The unsprung displacement $z_1$ of the front wheel 11F on a moving route at time t at the present, in the past, and in the future is represented by a function $z_1(t)$ of time t. Therefore, the unsprung displacement $z_1$ of the front wheel 11F at a position (ground contact point) pf0 at the present point in time tp is represented as $z_1(tp)$. Furthermore, the unsprung displacement $z_1$ of the rear wheel 11R at a position pr0 at the present point in time tp is equal to the unsprung displacement $z_1$ of the front wheel 11F at a point in time "tp−L/V1" which is earlier than the present point in time tp by a time (L/V1) which the front wheel 11F took to move over a distance corresponding to a wheelbase L. Therefore, the unsprung displacement $z_1$ of the rear wheel 11R at the present point in time tp is represented as $z_1(tp-L/V1)$.

(Preview Vibration Damping Control for the Front Wheel 11F)

The ECU 30 determines a predicted passage position pf1 of the front wheel 11F at a point in time (future) which is later than the present point in time tp by a front wheel advance read time tpf. Notably, the front wheel advance read time tpf is set in advance to a time which is necessary for the front wheel active actuator 17F to output the control force Fc_f corresponding to the target control force Fct_f after the ECU 30 has determined the predicted passage position pf1.

The predicted passage position pf1 of the front wheel 11F is a position that the front wheel 11F is predicted to pass when the front wheel advance read time tpf elapses from the present point in time. The predicted passage position pf1 is apart from the position pf0 of the front wheel 11F at the present point in time tp by a front wheel advance read distance Lpf (=V1×tpf) along a predicted route. The predicted route of the front wheel 11F means a route along which the front wheel 11F is predicted to move. As will be described later, the position pf0 is calculated on the basis of the present position of the vehicle 10 obtained by the position information obtaining device 31.

The ECU 30 previously obtains from the cloud 40 the preview reference data 43 for a region (preparation section, which will be described later) in the vicinity of the present position of the vehicle 10. Furthermore, the ECU 30 obtains from the position information obtaining device 31 the speed V1 of the vehicle 10 at the present point in time. Here, it is assumed that the speed V1 falls within the second range Vb2. In this case, the ECU 30 determines the second range Vb2 as a speed range corresponding to the speed V1. Subsequently, the ECU 30 obtains an unsprung displacement $z_1$(tp+tpf) on the basis of the predicted passage position pf1, the second range Vb2, and the preview reference data 43 obtained beforehand. Specifically, the ECU 30 obtains from the preview reference data 43 the unsprung displacement ($z_1$) 44c for the "case where the position information 44a is the predicted passage position pf1 and the speed range 44b is the second range Vb2." It is assumed that the predicted passage position pf1 is (X1, Y1). Accordingly, for the predicted passage position (X1, Y1), the ECU 30 obtains from the preview reference data 43 an unsprung displacement $z_1$ (=$z_1$_b) corresponding to the second range Vb2 (see FIG. 3). Notably, since the unsprung displacement $z_1$(tp+tpf) for predicted passage position (X1, Y1) is a piece of information obtained for execution of the preview vibration damping control, the unsprung displacement $z_1$(tp+tpf) may be referred to as the "preview information" in some cases.

The ECU 30 computes a target control force Fct_f (=βf× $z_1$(tp+tpf)) by applying the unsprung displacement $z_1$(tp+tpf) to the unsprung displacement $z_1$ of the following expression (8).

$$Fct\_f = \beta f \times z_1 \quad (8)$$

The ECU 30 transmits a control instruction containing the target control force Fct_f to the front wheel active actuator 17F such that the front wheel active actuator 17F generates a control force Fc_f corresponding to (equal to) the target control force Fct_f.

Figure 6:
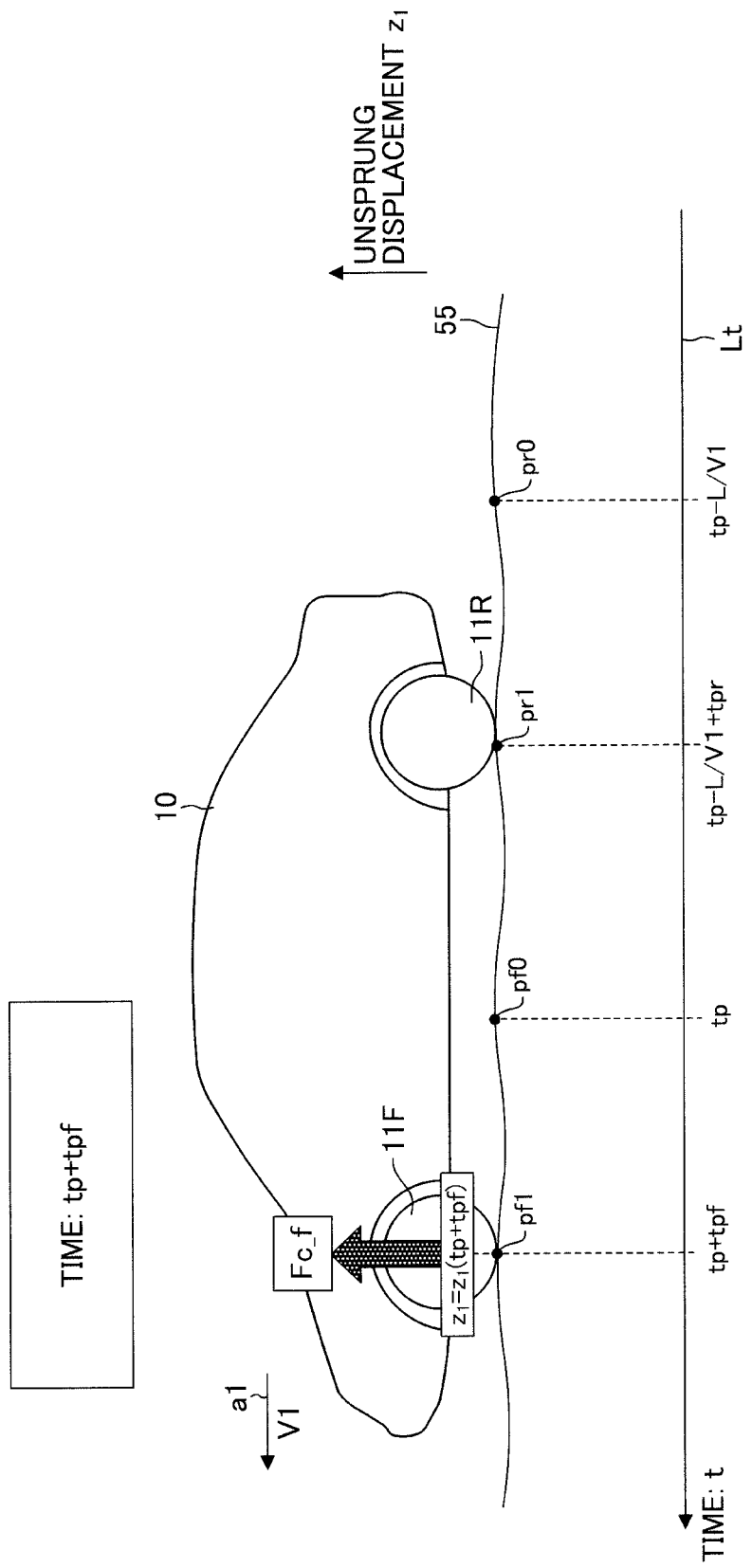
FIG. 6 is another chart used for describing the preview vibration damping control.

As shown in FIG. 6, the front wheel active actuator 17F generates the control force Fc_f corresponding to the target control force Fct_f at a point in time tp+tpf which is later than the present point in time tp by the front wheel advance read time tpf (namely, a timing when the front wheel 11F actually passes the predicted passage position pf1). Therefore, the front wheel active actuator 17F can generate at a proper timing the control force Fc_f which suppresses the vibration of the sprung portion 51 stemming from the unsprung displacement $z_1$ of the front wheel 11F at the predicted passage position pf1.

(Preview Vibration Damping Control for the Rear Wheel 11R)

As shown in FIG. 5, the ECU 30 determines a predicted passage position pr1 of the rear wheel 11R at a point in time (future) which is later than the present point in time tp by a rear wheel advance read time tpr. The rear wheel advance read time tpr is set in advance to a time which is necessary for the rear wheel active actuator 17R to output a control force Fc_r corresponding to the target control force Fct_r after the ECU 30 has determined the predicted passage position pr1.

Notably, in the case where the front wheel active actuator 17F and the rear wheel active actuator 17R differ in response, the front wheel advance read time tpf and the rear wheel advance read time tpr are set to different values in advance. In the case where the front wheel active actuator 17F and the rear wheel active actuator 17R are the same in response, the front wheel advance read time tpf and the rear wheel advance read time tpr are set to the same value beforehand.

The ECU 30 determines, as the predicted passage position pr1, a position that is apart from the position pr0 of the rear wheel 11R at the present point in time tp by a rear wheel advance read distance Lpr (=V1×tpr) along a predicted route of the rear wheel 11R for the case where the rear wheel 11R follows the same route as the front wheel 11F. The position pr0 is calculated on the basis of the present position of the vehicle 10 obtained by the position information obtaining device 31. Since the unsprung displacement $z_1$ at this predicted passage position pr1 is equal to the unsprung displacement $z_1$ at a point of time which is later, by the rear wheel advance read time tpr, than the "point in time (tp−L/V1) when the front wheel 11F was located at the position pr0 of the rear wheel 11R at the present point in time," the unsprung displacement $z_1$ at the predicted passage position pr1 can be represented as $z_1$(tp−L/V1+tpr).

The ECU 30 obtains the unsprung displacement $z_1$(tp−L/V1+tpr) on the basis of the predicted passage position pr1, the second range Vb2 corresponding to the speed V1, and the preview reference data 43 obtained beforehand. Specifically, the ECU 30 obtains, from the preview reference data 43, the unsprung displacement ($z_1$) 44c for the "case where the position information 44a is the predicted passage position pr1 and the speed range 44b is the second range Vb2." It is assumed that the predicted passage position pr1 is (X2, Y2). Accordingly, for the predicted passage position (X2, Y2), the ECU 30 obtains from the preview reference data 43 an unsprung displacement z1 (=z1_f) corresponding to the second range Vb2 (see FIG. 3). In this manner, the ECU 30 can obtain from the preview reference data 43 a piece of preview information (unsprung displacement $z_1$) corresponding to the predicted passage position pr1 (=(X2, Y2)) and the second range Vb2.

Furthermore, the ECU 30 computes a target control force Fct_r (=βr×$z_1$(tp−L/V1+tpr)) by applying the unsprung displacement $z_1$(tp−L/V1+tpr) to the unsprung displacement $z_1$ of the following expression (9). Notably, the gain βf in expression (8) and the gain βr in expression (9) are set to values different from each other. This is because the spring constant Kf of the left front wheel suspension 13FL and the right front wheel suspension 13FR differs from the spring constant Kr of the left rear wheel suspension 13RL and the right rear wheel suspension 13RR.

$$Fct\_r = \beta r \times z_1 \quad (9)$$

The ECU 30 transmits a control instruction containing the target control force Fct_r to the rear wheel active actuator 17R such that the rear wheel active actuator 17R generates a control force Fc_r corresponding to (equal to) the target control force Fct_r.

Figure 7:
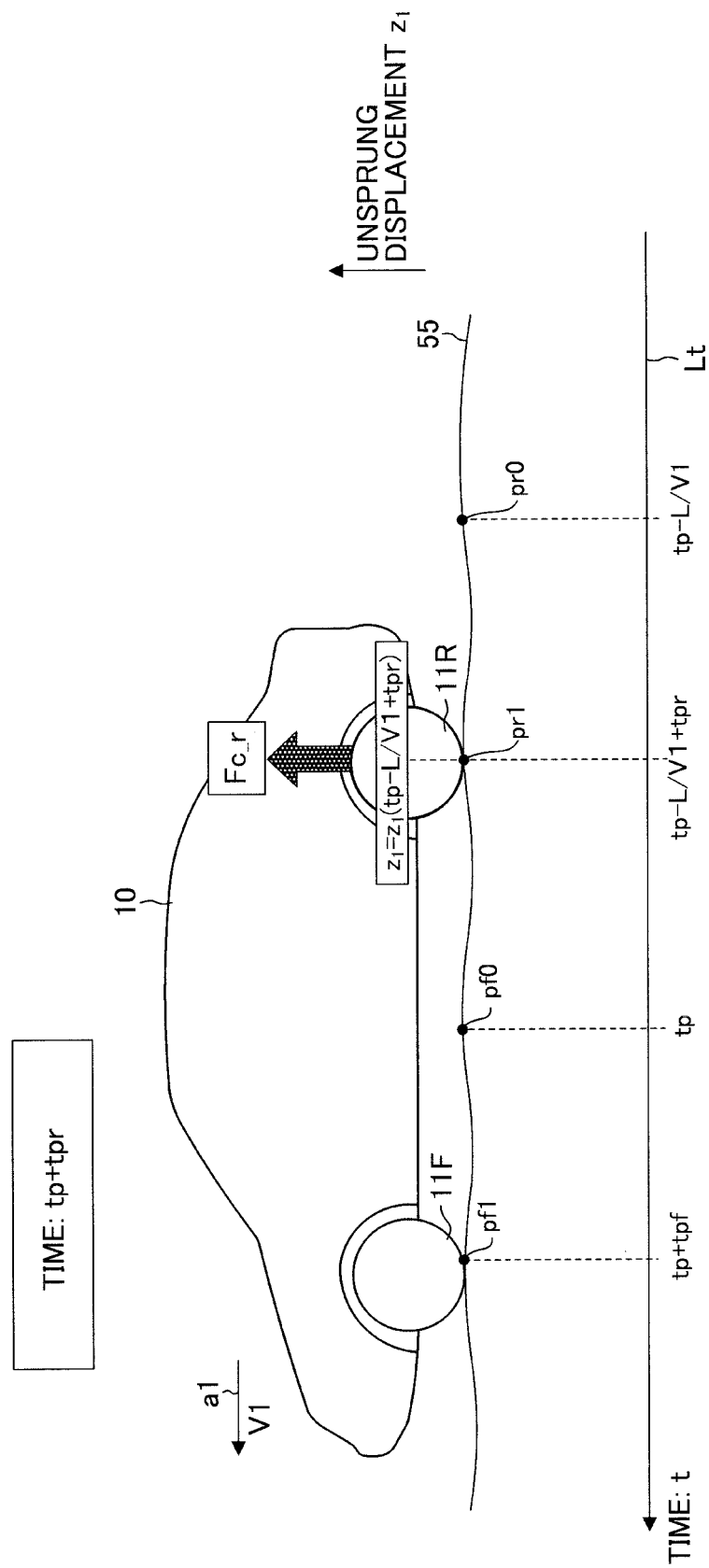
FIG. 7 is still another chart used for describing the preview vibration damping control.

As shown in FIG. 7, the rear wheel active actuator 17R generates the control force Fc_r corresponding to the target control force Fct_r at a point in time tp+tpr which is later than the present point in time tp by the rear wheel advance read time tpr (namely, a timing when the rear wheel 11R actually passes the predicted passage position pr1). Therefore, the rear wheel active actuator 17R can generate at a proper timing the control force Fc_r which suppresses the vibration of the sprung portion 51 stemming from the unsprung displacement $z_1$ of the rear wheel 11R at the predicted passage position pr1.

As described above, the vibration damping control apparatus 20 obtains the vehicle speed Vs at the present point in time. The vibration damping control apparatus 20 determines a predicted passage position (pf1 or pr1) of the wheel 11. The vibration damping control apparatus 20 obtains from the preview reference data 43 the unsprung displacement $z_1$ at the predicted passage position as the preview information. In the preview reference data 43, pieces of the position information 44a, the speed ranges 44b, and the unsprung displacements ($z_1$) 44c are stored in a mutually related manner. Accordingly, the vibration damping control apparatus 20 can obtain the unsprung displacement ($z_1$) 44c related to the speed range 44b corresponding to the vehicle speed Vs.

The vibration damping control apparatus 20 computes the target control force Fct on the basis of the preview information. The vibration damping control apparatus 20 controls the active actuator 17 in such a manner that the active actuator 17 outputs a control force Fc corresponding to the target control force Fct at a point in time when the wheel 11 passes the predicted passage position. Accordingly, the vibration damping control apparatus 20 can execute preview vibration damping control suitable for the vehicle speed Vs. As a result, it is possible to reduce the possibility that the effect of suppressing the vibration of the sprung portion 51 lowers or the vibration of the sprung portion 51 increases.

(Vibration Damping Control Routine)

Every time a predetermined time elapses, the CPU of the ECU 30 (hereinafter referred to as the "CPU1") executes a vibration damping control routine shown by a flowchart in FIG. 8. The CPU1 executes the vibration damping control routine for each of the wheels 11.

Notably, by executing an unillustrated routine every time a predetermined time elapses, the CPU1 previously obtains the preview reference data 43 for the preparation section from the cloud 40 and temporarily stores the preview reference data 43 in the RAM. The preparation section is a section of a road which the vehicle 10 is predicted to pass later on. For example, the preparation section is a section which starts at the front wheel predicted passage position pf1 and ends at a position that is apart from this front wheel predicted passage position pf1 by a predetermined preparation distance in the heading direction Td of the vehicle 10. Furthermore, the preparation distance is set to a value which is sufficiently larger than the above-described front wheel advance read distance Lpf.

Figure 8:
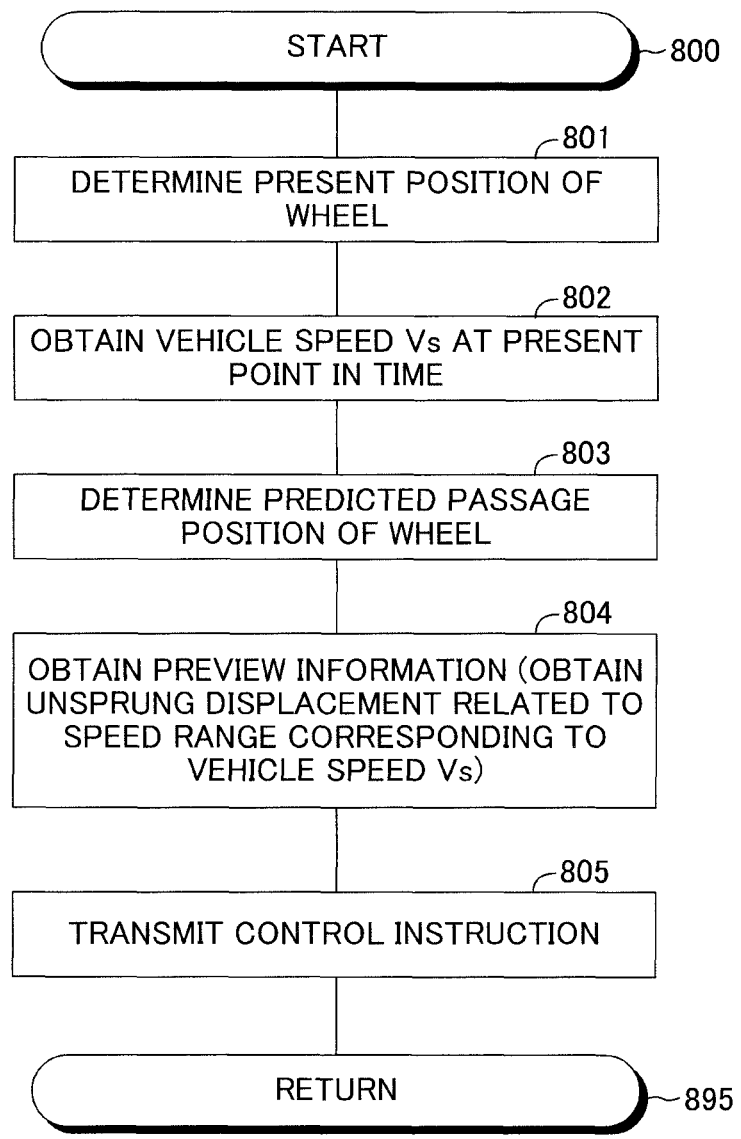
FIG. 8 is a flowchart representing a "vibration damping control routine" executed by a CPU of an electronic controller (30) according to the first embodiment.

When a predetermined timing has come, the CPU1 starts the process from step 800 of FIG. 8 and executes step 801 to step 805 in this order. Subsequently, the CPU1 proceeds to step 895 and ends the current execution of the present routine.

Step 801: The CPU1 determines the present positions of the wheels 11. Specifically, the CPU1 obtains the present position of the vehicle 10 and the heading direction Td of the vehicle 10 from the position information obtaining device 31. Positional relation data representing the relation between the position of each wheel 11 and the mounting position of the GNSS receiver in the vehicle 10 is stored in the ROM of the ECU 30 beforehand. The present position of the vehicle 10 obtained from the position information obtaining device 31 corresponds to the mounting position of the GNSS receiver. Accordingly, the CPU1 determines the position of each wheel 11 by referring to the present position of the vehicle 10, the heading direction Td of the vehicle 10, and the above-described positional relation data.

Step 802: The CPU1 obtains the vehicle speed Vs at the present point in time from the position information obtaining device 31.

Step 803: The CPU1 determines the predicted passage position (pf1 or pr1) of the wheel 11 in a manner described below.

In the case of the front wheel 11F, the CPU1 determines a predicted route of the front wheel 11F. The predicted route of the front wheel 11F is a route along which the front wheel 11F is predicted to move. The CPU1 computes the front wheel advance read distance Lpf by multiplying the vehicle speed Vs by the front wheel advance read time tpf. Furthermore, the CPU1 determines, as the front wheel predicted passage position pf1, a position that the front wheel 11F reaches as a result of advancement over the front wheel advance read distance Lpf from its present position along the predicted route of the front wheel 11F.

In the case of the rear wheel 11R, the CPU1 determines a predicted route of the rear wheel 11R under the assumption that the rear wheel 11R follows the same route as the front wheel 11F. The CPU1 computes the rear wheel advance read distance Lpr by multiplying the vehicle speed Vs by the rear wheel advance read time tpr. Furthermore, the CPU1 determines, as the rear wheel predicted passage position pr1, a position that the rear wheel 11R reaches as a result of advancement over the rear wheel advance read distance Lpr from its present position along the predicted route of the rear wheel 11R.

Step 804: The CPU1 obtains the preview information (the unsprung displacement $z_1$ at the predicted passage position) from the preview reference data 43 stored in the RAM (namely, the preview reference data 43 for the preparation section). Specifically, for the predicted passage position determined in step 803, the CPU1 obtains the unsprung displacement $z_1$ (44c) related to the speed range 44b corresponding to the vehicle speed Vs.

Step 805: The CPU1 computes the target control force Fct as described above by using the unsprung displacement $z_1$ obtained in step 804. The CPU1 transmits a control instruction containing the target control force Fct to the active actuator 17.

In the case of the front wheel 11F, the CPU1 computes the target control force Fct_f for the front wheel 11F in accordance with expression (8) and transmits a control instruction containing the target control force Fct_f to the front wheel active actuator 17F.

In the case of the rear wheel 11R, the CPU1 computes the target control force Fct_r for the rear wheel 11R in accordance with expression (9) and transmits a control instruction containing the target control force Fct_r to the rear wheel active actuator 17R.

As can be understood from the above description, in the preview reference data 43, the road surface displacement related values (the unsprung displacements $z_1$) are managed according to the speed ranges (Vb1 to Vb4); i.e., on a speed range by speed range basis. The vibration damping control apparatus 20 can execute the preview vibration damping control by obtaining from the preview reference data 43 the unsprung displacement $z_1$ suitable for the speed of the vehicle 10 at the present point in time. The frequency band of vibrations that can be suppressed by the preview vibration damping control coincides with the frequency band of vibrations generated in the measurement vehicle when the unsprung displacements ($z_1$) 44c of the preview reference data 43 were obtained. Accordingly, it is possible to reduce the possibility that the effect of suppressing the vibration of the sprung portion 51 lowers or the vibration of the sprung portion 51 increases. Furthermore, the active actuator 17 is not driven for vibrations that cannot be suppressed by the preview vibration damping control (for example, vibrations within the above-described frequency band ranging from the frequency fb_high to the frequency fa_high). It is possible to reduce the possibility that excess energy is consumed by the active actuator 17.

(Configuration of Data Management System)

Figure 9:
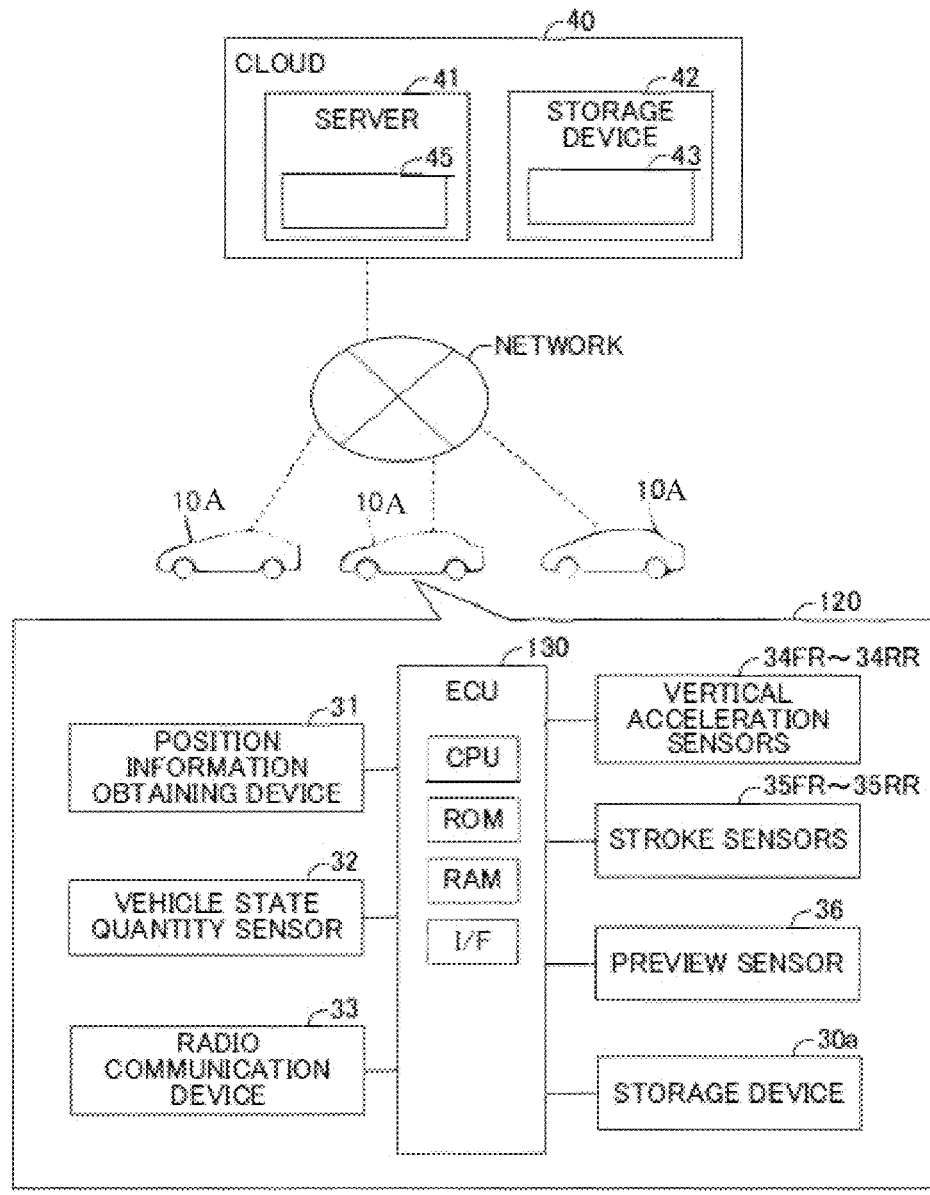
FIG. 9 is a schematic diagram of a data management system according to the first embodiment.

The data management system according to the first embodiment is a system for creating the preview reference data 43. As shown in FIG. 9, the data management system includes a plurality of measurement vehicles (measurement vehicles 10A in the present example) and the cloud 40. Each measurement vehicle 10A includes a data collection device 120. The data collection device 120 includes an electronic controller 130 (hereinafter referred to as the "ECU 130"), a position information obtaining device 31, a vehicle state quantity sensor 32, a radio communication device 33, vertical acceleration sensors 34FR to 34RR, stroke sensors 35FR to 35RR, a preview sensor 36, and a storage device 30a.

The ECU 130 is connected to the position information obtaining device 31, the vehicle state quantity sensor 32, and the radio communication device 33. Since the configurations of these devices and sensor have already been described, their detailed descriptions will not be repeated.

Furthermore, the ECU 130 is connected to the vertical acceleration sensors 34FL to 34RR, the stroke sensors 35FL to 35RR, and the preview sensor 36 and receives signals output from these sensors.

The vertical acceleration sensors 34FL to 34RR detect vertical accelerations (the sprung accelerations $ddz_2FL$ to $ddz_2RR$) of the body 10a (the sprung portion 51) at the positions of the wheels 11FL to 11RR and output signals representing the vertical accelerations. Notably, the vertical acceleration sensors 34FL to 34RR will be referred to as the "vertical acceleration sensor(s) 34" in the case where they are not required to be distinguished from one another. Similarly, the sprung accelerations $ddz_2FL$ to $ddz_2RR$ will be referred to as the "sprung acceleration(s) $ddz_2$."

The stroke sensors 35FL to 35RR are provided for the suspensions 13FL to 13RR, respectively. The stroke sensors 35FL to 35RR respectively detect the vertical strokes Hfl to Hrr of the suspensions 13FL to 13RR and output signals representing the vertical strokes. The strokes Hfl to Hrr are vertical strokes of the wheel support members 12FL to 12RR (unsprung portion 50) in relation to the body 10a (the sprung portion 51) at the positions of the wheels 11 shown in FIG. 1. Notably, the stroke sensors 35FL to 35RR will be referred to as the "stroke sensor(s) 35" in the case where they are not required to be distinguished from one another. Similarly, the strokes Hfl to Hrr will be referred to as the "stroke(s) H."

The preview sensor 36 is, for example, a camera sensor, a LiDAR and/or a radar sensor. The preview sensor 36 detects a road surface displacement $z_0$ representing the displacement of the road surface in the vertical direction and outputs a signal representing the road surface displacement $z_0$.

The ECU 130 determines the present positions of the wheels 11 by referring to the present position of the measurement vehicle 10A, the heading direction Td of the measurement vehicle 10A, and the above-described positional relation data. The ECU 130 obtains the vehicle speed Vs at the present point in time from the position information obtaining device 31. Furthermore, the ECU 130 obtains the sprung acceleration $ddz_2$ from each of the vertical acceleration sensor 34, and obtains the stroke H from each of the stroke sensors 35.

The ECU 130 transmits a predetermined time series data (hereinafter referred to as "sensing data") to the server 41 via the radio communication device 33. The sensing data includes time series data of the positions of the wheels 11, time series data of the vehicle speed Vs, time series data of the sprung accelerations $ddz_2$, and time series data of the strokes H. Notably, in the sensing data, the positions of the wheels 11, the vehicle speed Vs, the sprung accelerations $ddz_2$, and the strokes H are added with pieces of information representing times when these values were detected.

(Details of Data Processing)

The details of data processing which is performed by the server 41 so as to create the preview reference data 43 will be described. As shown in FIG. 9, the server 41 includes a data processing section 45 as a functional component. The data processing section 45 is realized by a combination of software and hardware resources such as a CPU, a RAM, etc.

The data processing section 45 receives sensing data from each of the measurement vehicles 10A (the ECUs 130) and stores the received sensing data in the storage device 42.

Every time a predetermined time elapses, the data processing section 45 obtains a predetermined amount of sensing data from the storage device 42. Subsequently, the data processing section 45 processes the predetermined amount of sensing data together as described below, thereby computing the unsprung displacement $z_1$.

The data processing section 45 performs a second-order integration process (second-order time integration process) on the time series data of the sprung acceleration $ddz_2$. As a result, time series data of sprung displacement $z_2$ is produced. Next, the data processing section 45 performs a band-pass filter process (hereinafter referred to as the "BPF process") on the time series data of the sprung displacement $z_2$ so as to allow components in a specific frequency band to pass. As a result of the BPF process, time series data of the sprung displacement $z_2$ from which components outside the specific frequency band have been removed is produced.

The above-described specific frequency band may be a frequency band selected to contain at least the resonance frequency of the sprung portion. In the present example, the specific frequency band ranges from a first cutoff frequency to a second cutoff frequency. The first cutoff frequency is set to be lower than the resonance frequency of the sprung portion. The second cutoff frequency is set to be lower than the resonance frequency of the unsprung portion and higher than the resonance frequency of the sprung portion.

The BPF process is performed by, for example, zero-phase filter process. Namely, the data processing section 45 performs on the time series data of the sprung displacement $z_2$ both a process performed in the forward direction on the time axis (a BPF process in which the time series data is processed from the first value toward the last value) and a process performed in the backward direction on the time axis (a BPF process in which the time series data is processed from the last value toward the first value), and adds the results of the processes together for averaging. It is known that, in such zero-phase filter process, phase delay due to filtering does not occur.

Notably, the BPF process may be performed by using FFT (Fast Fourier Transform).

Furthermore, the data processing section 45 performs a BPF process on the time series data of the stroke H so as to allow components within the above-described specific frequency band to pass. As a result of the BPF process, time series data of the stroke H from which components outside the specific frequency band have been removed are produced. This BPF process is performed by the zero-phase filter process as in the above-described case. Notably, the BPF process may be performed by using FFT.

The data processing section 45 computes the unsprung displacement $z_1$ by subtracting the BPF processed stroke H ($=z_2-z_1$) from the BPF processed sprung displacement $z_2$. As a result, time series data of unsprung displacement $z_1$ is produced.

The data processing section 45 converts the vehicle speed Vs in each piece of the time series data of the vehicle speed Vs to a speed range (one of the first range Vb1 to the fourth range Vb4) corresponding to the vehicle speed Vs. As a result, the time series data of the speed range is produced.

The data processing section 45 relates the time series data of the position of the wheel 11, the time series data of the speed range, and the time series data of the unsprung displacement $z_1$ to one another. Subsequently, the data processing section 45 stores the combination of "the position, the speed range, and the unsprung displacement $z_1$" in the table 44 of the preview reference data 43.

(Data Creation Routine)

Every time a predetermined time elapses, the CPU of the server 41 (hereinafter referred to as the "CPU2") executes a data creation routine shown by a flowchart shown in FIG. 10.

Notably, by executing an unillustrated routine every time a predetermined time elapses, the CPU2 receives sensing data from each of the plurality of measurement vehicles 10A and accumulates the received sensing data in the storage device 42.

Figure 10:
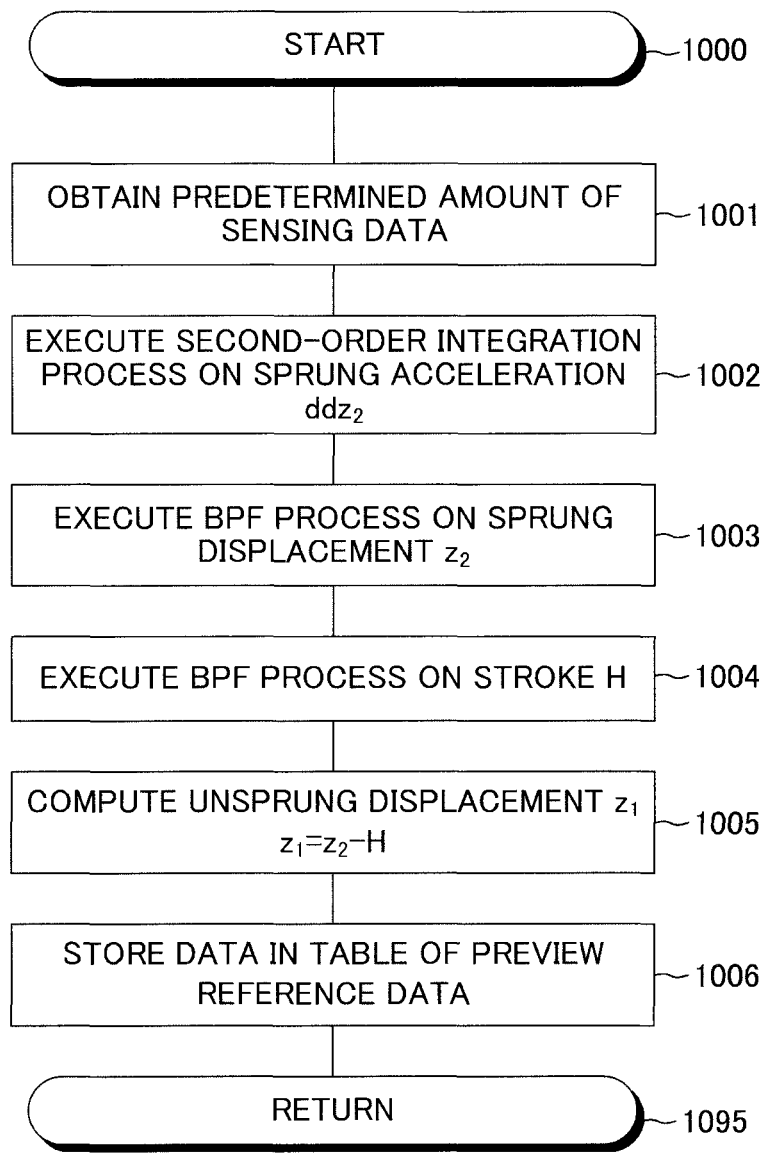
FIG. 10 is a flowchart representing a "data creation routine" executed by a CPU of a server (41) according to the first embodiment.

When a predetermined timing has come, the CPU2 starts the process from step 1000 of FIG. 10 and executes step 1001 to step 1006 in this order. Subsequently, the CPU2 proceeds to step 1095 and ends the current execution of the present routine.

Step 1001: The CPU2 obtains a predetermined amount of sensing data from the storage device 42.

Step 1002: The CPU2 executes a second-order integration process on the time series data of the sprung acceleration $ddz_2$ as described above, thereby producing the time series data of the sprung displacement $z_2$.

Step 1003: The CPU2 executes a BPF process on the time series data of the sprung displacement $z_2$ as described above.

Step 1004: The CPU2 executes a BPF process on the time series data of the stroke H as described above.

Step 1005: The CPU2 subtracts the BPF processed stroke H from the BPF processed sprung displacement $z_2$, thereby producing the time series data of the unsprung displacement $z_1$.

Step 1006: The CPU2 converts the vehicle speed Vs in each piece of the time series data of the vehicle speed Vs to a speed range (one of the first range Vb1 to the fourth range Vb4) corresponding to that vehicle speed Vs. The CPU2 relates the time series data of the position of the wheel 11, the time series data of the speed range, and the time series data of the unsprung displacement $z_1$ with one another. Subsequently, the CPU2 stores in the table 44 of the preview reference data 43 the combination of "the position, the speed range, and the unsprung displacement $z_1$," which have been related to one another.

According to the above-described configuration, the road surface displacement related values (the unsprung displacements $z_1$) are managed on a speed range by speed range basis in the preview reference data 43. The server 41 is configured to provide the preview reference data 43 to the vehicle 10 in response to a request from the vibration damping control apparatus 20 (the ECU 30). Accordingly, when the vehicle 10 executes the preview vibration damping control, the server 41 can provide to the vehicle 10 the unsprung displacements $z_1$ suitable for the vehicle speed Vs.

Furthermore, the server 41 does not execute the integration process and the BPF processes on the sensing data in real time, and processes a predetermined amount of sensing data together at a certain timing. Such a process will be called "offline process" in some cases. Since the data processing section 45 performs the integration process and the BPF processes on the sensing data offline, no limitation is imposed on computation time unlike the case of real time processing. Furthermore, it is possible to perform an ideal integration process whose integration error is small and a filter process which is free from phase shift. Therefore, the server 41 can create the preview reference data 43 in which the accurate unsprung displacements $z_1$ and the vehicle speed Vs (the speed range 44b) are related to each other.

Second Embodiment

As described above, the preview reference data 43 is created on the basis of various types of information (the vehicle speed Vs, the sprung accelerations $ddz_2$, and the strokes H) obtained when the measurement vehicle 10A actually traveled on road surfaces. For example, in the case where a new road has been constructed, it takes time to create the preview reference data 43 for the road. A situation may arise where the unsprung displacements z1 related to the speed range corresponding to the vehicle speed Vs are not present in the preview reference data 43 when the vehicle 10 travels on the new road. In the case where such a situation occurs, a vibration damping control apparatus 20 according to a second embodiment executes the preview vibration damping control as follows.

FIG. 11 shows a table 44 regarding a certain road R1. At the present point in time, the unsprung displacements $z_1$ have not been collected sufficiently for the road R1. In a situation where the vehicle 10 is traveling on the road R1, the vibration damping control apparatus 20 executes the preview vibration damping control. Currently, the predicted passage position of the wheel 11 is (X4, Y4), and the vehicle speed Vs is a certain value Vsm within the second range Vb2. However, in the preview reference data 43, the unsprung displacement ($z_1$) 44c for the "case where the position information 44a is (X4, Y4) and the speed range 44b is the second range Vb2" is not present. In such a case, the ECU 30 obtains, as the preview information, the "unsprung displacement ($z_1$) 44c related to the speed range 44b which is other than the second range Vb2 corresponding to the vehicle speed Vsm and is the closest to the vehicle speed Vsm." In the following description, the "speed range 44b which is other than the speed range corresponding to the vehicle speed and is the closest to the vehicle speed" is referred to as the "speed range 44b_clst."

The ECU 30 computes a first value d1. The first value d1 is the absolute value of the difference between the vehicle speed Vsm and the upper limit value (Vs1) of the speed range (the first range Vb1) which is on the lower side of the second range Vb2 and is the closest to the vehicle speed Vsm (namely, d1=|Vsm−Vs1|). Furthermore, the ECU 30 computes a second value d2. The second value d2 is the absolute value of the difference between the vehicle speed Vsm and the lower limit value (Vs2) of the speed range (the third range Vb3) which is on the higher side of the second range Vb2 and is the closest to the vehicle speed Vsm (namely, d2=|Vsm−Vs2|). The ECU 30 selects, as the "speed range $44b\_clst$" the speed range $44b$ corresponding to a smaller one of the first value d1 and the second value d2.

Now, it is assumed that the first value d1 is smaller than the second value d2. The ECU 30 selects the first range Vb1 as the speed range $44b\_clst$. Accordingly, for the predicted passage position (X4, Y4), the ECU 30 obtains, as the preview information, the unsprung displacement $(z_1)$ $44c$ $(=z_1\_i)$ related to the first range Vb1. The ECU 30 executes the preview vibration damping control by using the obtained unsprung displacement $z_1$ $(=z_1\_i)$. As described above, even when the unsprung displacement $z_1$ related to the second range Vb2 corresponding to the vehicle speed Vsm is not present in the preview reference data 43, the vibration damping control apparatus 20 executes the preview vibration damping control by obtaining the unsprung displacement $(z_1)$ $44c$ related to the speed range $44b\_clst$.

Notably, in the case where, as shown in FIG. 11, the unsprung displacement $(z_1)$ $44c$ related to the fourth range Vb4 is not present (see position information (X5, Y5)), the ECU 30 selects the third range Vb3 as the speed range $44b\_clst$. Similarly, in the case where the unsprung displacement $(z_1)$ $44c$ related to the first range Vb1 is not present (see position information (X5, Y5)), the ECU 30 selects the second range Vb2 as the speed range $44b\_clst$.

Figure 12:
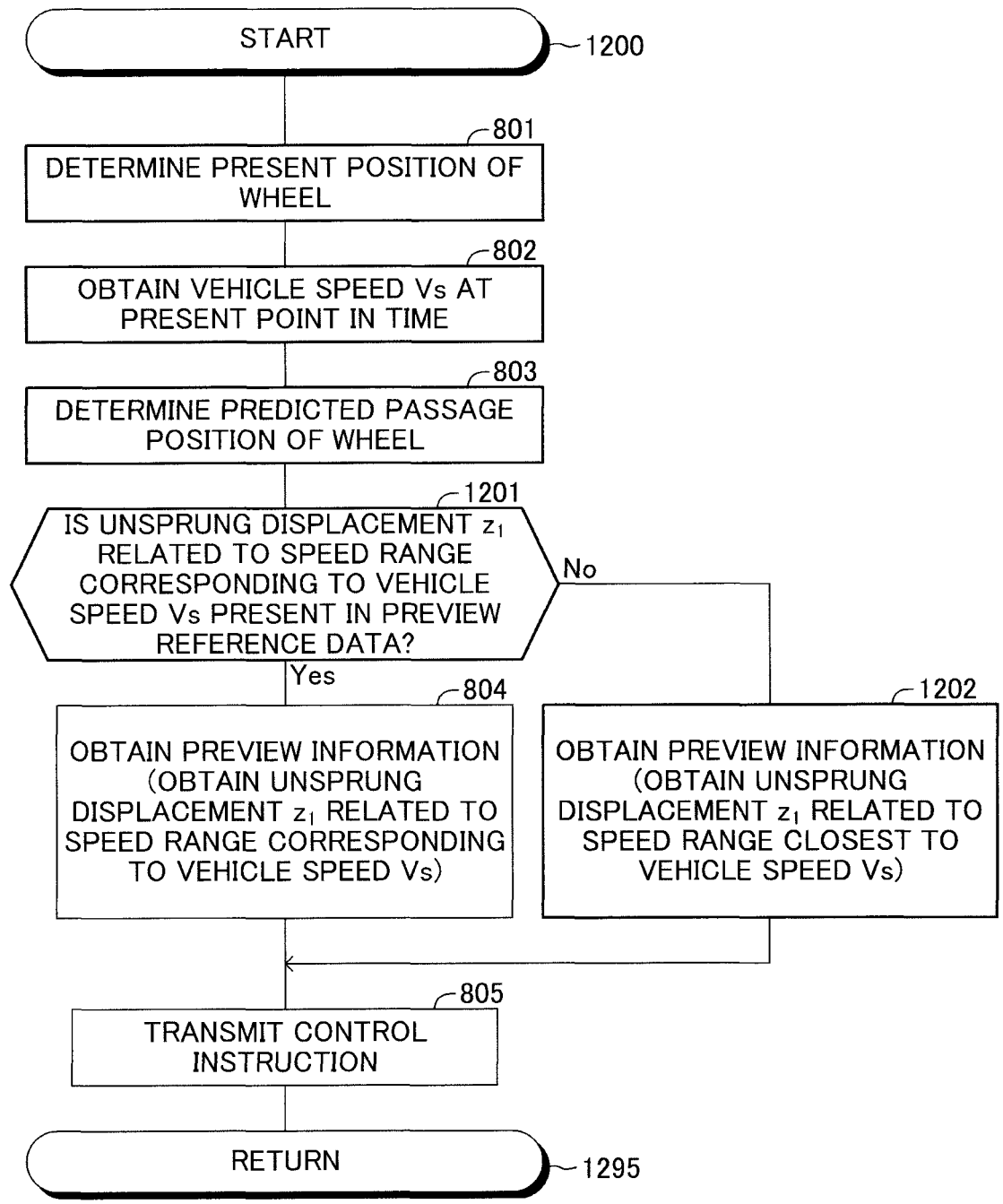
FIG. 12 is a flowchart representing a "vibration damping control routine" executed by a CPU of an electronic controller (30) according to a second embodiment.

The CPU1 of the ECU 30 executes a vibration damping control routine shown in FIG. 12 instead of the routine shown in FIG. 8. Notably, of the steps shown in FIG. 12, steps for performing the same processes as the steps shown in FIG. 8 are denoted by reference numerals identical with those used in FIG. 8, and their descriptions will not be repeated.

Accordingly, when a predetermined timing had come, the CPU1 starts the process from step 1200. After executing the processes of step 801 to step 803, the CPU1 proceeds to step 1201. The CPU1 determines whether or not a predetermined condition is satisfied. This condition is satisfied when, for the predicted passage position determined in step 803 (the position information $44a$), the unsprung displacement $z_1$ $(44c)$ related to the speed range $44b$ corresponding to the vehicle speed Vs is present in the preview reference data 43. In the case where the above-described condition is satisfied, the CPU1 makes a "Yes" determination in step 1201 and executes the processes of step 804 and step 805 as described above. After that, the CPU1 proceeds to step 1295 and ends the current execution of the present routine.

Meanwhile, in the case where the above-described condition is not satisfied, the CPU1 makes a "No" determination in step 1201 and proceeds to step 1202. In step 1202, as described above, for the predicted passage position (position information $44a$), the CPU1 obtains the unsprung displacement $(z_1)$ $44c$ related to the speed range $44b\_clst$ which is the closest to the vehicle speed Vs. Subsequently, the CPU1 proceeds to step 805 and computes the target control force Fct by using the unsprung displacement $(z_1)$ $44c$ obtained in step 1202. The CPU1 transmits a control instruction containing the target control force Fct to the active actuator 17. After that, the CPU1 proceeds to step 1295 and ends the current execution of the present routine.

Notably, there may be the case where the unsprung displacement $(z_1)$ $44c$ related to any of the speed ranges Vb1 to Vb4 is not present at the point in time when the CPU1 proceeds to step 1202. In such a case, the CPU1 proceeds from step 1201 to step 1295 directly, without executing the preview vibration damping control.

According to the above-described configuration, depending on the state of the preview reference data 43, the vibration damping control apparatus 20 obtains the unsprung displacement $z_1$ $(44c)$ related to the speed range $44b$ corresponding to the vehicle speed or the unsprung displacement $z_1$ $(44c)$ related to the speed range $44b$ which is other than the speed range $44b$ corresponding to the vehicle speed and is close to the vehicle speed. Specifically, in the case where the unsprung displacement $z_1$ related to the speed range corresponding to the vehicle speed Vs is not present in the preview reference data 43, the vibration damping control apparatus 20 executes the preview vibration damping control while obtaining the unsprung displacement $(z_1)$ $44c$ related to the speed range $44b\_clst$ which is the closest to the vehicle speed Vs. Since the difference between the vehicle speed Vs and the speed range $44b\_clst$ is small, the frequency band of vibrations that can be suppressed by the preview vibration damping control approximately coincides with the frequency band of vibrations generated in the measurement vehicle when the unsprung displacements $(z_1)$ $44c$ of the preview reference data 43 were obtained. Accordingly, it is possible to reduce the possibility that the effect of suppressing the vibration of the sprung portion 51 lowers or the vibration of the sprung portion 51 increases.

The present disclosure is not limited to the above-described embodiments, and various modifications can be employed within the range of the present disclosure.

First Modification

In step 804, the CPU1 may execute a process as described below. The CPU1 may obtain, as the preview information, a first unsprung displacement $z_1\_c1$ and a second unsprung displacement $z_1\_c2$. The first unsprung displacement $z_1\_c1$ is the unsprung displacement $z_1$ $(44c)$ which is for the predicted passage position and is related to the speed range $44b$ corresponding to the vehicle speed Vs. The second unsprung displacement $z_1\_c2$ is the unsprung displacement $z_1$ $(44c)$ which is for the predicted passage position and is related to the speed range $44b\_clst$ which is other than the speed range $44b$ corresponding to the vehicle speed Vs and is the closest to the vehicle speed Vs.

The preview reference data 43 is in the state shown in FIG. 3. It is assumed that the predicted passage position of the wheel 11 is (X3, Y3), and the vehicle speed Vs is Vsn within the second range Vb2. First, the CPU1 obtains, as the first unsprung displacement $z_1\_c1$, an unsprung displacement $z_1$ $(=z_1\_j)$ related to the speed range $44b$ $(=Vb2)$ corresponding to the vehicle speed Vsn.

Subsequently, the CPU1 computes the first value d1 $(=|Vsn-V1|)$ and the second value d2 $(=|Vsn-V2|)$. The CPU1 selects, as the "speed range $44b\_clst$," the speed range $44b$ corresponding to a smaller one of the first value d1 and the second value d2. It is assumed that the first value d1 is smaller than the second value d2. Accordingly, the CPU1 selects the first range Vb1. The CPU1 obtains, as the second unsprung displacement $z_1\_c2$, an unsprung displacement $z_1$ $(=z_1\_i)$ related to the first range Vb1.

The CPU1 computes an unsprung displacement $z_1'$ for the preview vibration damping control in accordance with the following expression (10), wherein w1 and w2 are weighting factors. For example, the weighting factors w1 and w2 are such that w1+w2=1. In step 805, the CPU1 computes the target control force Fct by using the unsprung displacement $z_1'$.

$$z_1'=w1 \cdot z_{1\_}c1+w1 \cdot z_{1\_}c2 \quad (10)$$

As described above, the CPU1 may compute the target control force Fct by using the weighted sum of the first unsprung displacement $z_{1\_}c1$ and the second unsprung displacement $z_{1\_}c2$. For example, in the case where the vehicle speed Vsn is close to the boundary value (V1) of the first range Vb1, it is considered that both the first unsprung displacement $z_{1\_}c1$ and the second unsprung displacement $z_{1\_}c2$ have the effect of suppressing the vibration of the sprung portion 51. The CPU1 of the present example can compute a proper target control force Fct for suppressing the vibration of the sprung portion 51 by using both the first unsprung displacement $z_{1\_}c1$ and the second unsprung displacement $z_{1\_}c2$.

Second Modification

In step 1202, the CPU1 may execute a process as described below. The CPU1 may obtain, as the preview information, a third unsprung displacement $z_{1\_}c3$ and a fourth unsprung displacement $z_{1\_}c4$. The third unsprung displacement $z_{1\_}c3$ is the unsprung displacement ($z_1$) 44c which is for the predicted passage position and corresponds to the speed range 44b on the lower side of the speed range 44b corresponding to the vehicle speed Vs. The fourth unsprung displacement $z_{1\_}c4$ is the unsprung displacement ($z_1$) 44c which is for the predicted passage position and corresponds to the speed range 44b on the higher side of the speed range 44b corresponding to the vehicle speed Vs.

The preview reference data 43 is in the state shown in FIG. 11. It is assumed that the predicted passage position of the wheel 11 is (X4, Y4), and the vehicle speed Vs is Vsn within the second range Vb2. In this case, the CPU1 obtains, as the third unsprung displacement $z_{1\_}c3$, an unsprung displacement ($z^1$) 44c (=$z_{1\_}i$) related to the first range Vb1. Furthermore, the CPU1 obtains, as the fourth unsprung displacement $z_{1\_}c4$, an unsprung displacement ($z^1$) 44c (=$z_{1\_}j$) related to the third range Vb3. The CPU1 computes an unsprung displacement $z_1'$ for the preview vibration damping control in accordance with the following expression (11), wherein w3 and w4 are weighting factors. For example, the weighting factors w3 and w4 are such that w3+w4=1. Subsequently, in step 805, the CPU1 computes the target control force Fct by using the unsprung displacement $z_1'$. As described above, the CPU1 may compute the target control force Fct by using the weighted sum of the third unsprung displacement $z_{1\_}c3$ and the fourth unsprung displacement $z_{1\_}c4$. An unsprung displacement $z_1'$ appropriate for the vehicle speed Vs can be obtained from the two unsprung displacements ($z_{1\_}c3$ and $z_{1\_}c4$).

$$z_1'=w3 \cdot z_{1\_}c3+w4 \cdot z_{1\_}c4 \quad (11)$$

The CPU1 may compute the first value d1 and the second value d2. In the case where the first value d1 is smaller than the second value d2, the CPU1 may set the weighting factor w3 to be lager than the weighting factor w4. In the case where the second value d2 is smaller than the first value d1, the CPU1 may set the weighting factor w4 to be lager than the weighting factor w3.

Third Modification

In step 1202, the CPU1 may execute a process as described below. Currently, the preview reference data 43 is in a state shown in FIG. 11. Furthermore, the predicted passage position of the wheel 11 is (X6, Y6), and the vehicle speed Vs at the present point in time is Vsn within the second range Vb2. In such a situation, the CPU1 computes the absolute value (=|Vsn−Vs3|) of the difference between the vehicle speed Vsn and the lower limit value (Vs3) of the speed range 44b (the fourth range Vb4) in which the unsprung displacement ($z_1$) 44c is present. In the case where the value (|Vsn−Vs3|) is greater than a predetermined difference threshold, the CPU1 may proceed directly to step 1295 without obtaining the preview information in step 1202. Namely, the CPU1 does not execute the preview vibration damping control. As described above, in the case where only the unsprung displacement ($z_1$) 44c related to the speed range (Vb4) which is far from the vehicle speed Vsn is present, the CPU1 does not execute the preview vibration damping control. It is possible to reduce the possibility that the vibration of the sprung portion 51 increases.

Fourth Modification

The ECU 30 may be connected to the vertical acceleration sensors 34FL to 34RR, the stroke sensors 35FL to 35RR, and the preview sensor 36 and receive signals output from these sensors. In this configuration, the ECU 30 may obtain the road surface displacement related value on the basis of the signals from these sensor while the vehicle 10 is traveling. The ECU 30 may compute the unsprung displacement $z_1$ by subtracting the stroke H from the sprung displacement $z_2$. The ECU 30 may obtain the road surface displacement $z_0$ from the preview sensor 36. The ECU 30, the vertical acceleration sensor 34, the stroke sensor 35, and the preview sensor 36 are components for obtaining the road surface displacement related value and may be referred to as the "information obtaining apparatus for obtaining the road surface displacement related value" in some cases.

In the above-described configuration, the CPU1 of the ECU 30 may compute the target control force Fct in accordance with the following expression (12), where $G_1$ and $G_2$ are gains. F1 is a control force computed by using the preview information and is computed in accordance with the following expression (13). Expression (13) is the same as expression (7). In the following description, F1 will be referred to as the "first target control force F1."

$$Fct=G_1 \cdot F1+G_2 \cdot F2 \quad (12)$$

$$F1=\beta_2 \times z_1 \quad (13)$$

F2 includes target control force for feedforward control and/or target control force for feedback control and will be referred to as the "second target control force F2" in the following description. The second target control force F2 includes at least one of F2_a of expression (14), F2_b of expression (15), and F2_c of expression (16). F2_a is the target control force for feedforward control and computed by using the road surface displacement $z_0$ ahead of the vehicle 10 which was obtained by the preview sensor 36. $\beta_3$ is a gain. F2_b is the target control force for feedback control for damping the vibration of the sprung portion 51. F2_b is determined to make $dz_2$ zero. F2_c is the target control force for feedforward control of the rear wheel 11R. Namely, since the rear wheel 11R conceivably follows the route of the front wheel 11F, the CPU1 may execute the preview vibration damping control for the rear wheel 11R by using the unsprung displacement $z_1$ computed for the passage position of the front wheel 11F. F2_c is computed by applying to expression (16) the unsprung displacement $z_1$ computed for the passage position of the front wheel 11F. $\beta_4$ is a gain.

$$F2\_a = \beta_3 \times z_0 \quad (14)$$

$$F2\_b = \gamma_0 \cdot dz_2 \quad (15)$$

$$F2\_c = \beta_4 \times z_1 \quad (16)$$

Accordingly, in the case of the front wheel 11F, the second target control force F2 may be one of F2_a of expression (14) and F2_b of expression (15), or the sum of F2_a and F2_b. In the case of the rear wheel 11R, the second target control force F2 may be one of F2_a of expression (14), F2_b of expression (15), and F2_c of expression (16), or the sum of two or more of F2_a, F2_b, and F2_c.

In a certain example, the CPU1 may set the gain $G_2$ for the case where the CPU1 makes a "No" determination in step 1201 to be greater than the gain $G_2$ for the case where the CPU1 makes a "Yes" determination in step 1201. Even in the case where the unsprung displacement $z_1$ (44c) related to the speed range 44b corresponding to the vehicle speed is not present in the preview reference data 43, vibrations can be suppressed by increasing the component of the second target control force F2 in the target control force Fct.

In another example, when the CPU1 makes a "Yes" determination in step 1201, the CPU1 may set the gain $G_1$ to be greater than the gain $G_2$. For example, when the CPU1 makes a "Yes" determination in step 1201, the CPU1 may set the gain $G_2$ to zero. It is possible to enhance the vibration damping performance by increasing the component of the first target control force F1 in the target control force Fct.

In still another example, when the CPU1 makes a "No" determination in step 1201, the CPU1 may set the gain $G_1$ to zero. It is possible to suppress vibrations by the second target control force F2. As described above, the CPU1 may change either or both of the gain $G_1$ and the gain $G_2$ depending on whether or not the unsprung displacement $z_1$ (44c) related to the speed range 44b corresponding to the vehicle speed is present in the preview reference data 43.

Notably, the expression used for computing F2_b for feedback control is not limited to expression (15) and may be an expression which includes at least one of the term of the sprung displacement $z_z$, the term of the sprung speed $dz_2$, the term of the sprung acceleration $ddz_2$, the term of the unsprung displacement $z_1$, and the term of the unsprung speed $dz_1$. For example, the CPU1 may compute F2_b in accordance with the following expression (17), where each of $\gamma_1, \gamma_2, \gamma_3, \gamma_4,$ and $\gamma_5$ is a gain.

$$F2\_b = \gamma_1 \times ddz_2 + \gamma_2 \times dz_2 + \gamma_3 \times z_2 + \gamma_4 \times dz_1 + \gamma_5 \times z_1 \quad (17)$$

Fifth Modification

The preview reference data 43 is not limited to the above-described example. As shown in FIG. 13, the preview reference data 43 may be data in which the road surface displacement related value (in the present example, the unsprung displacement $z_1$ (44c)), the position information 44a, and speed information 44b' are related to one another. The road surface displacement related value was obtained when the measurement vehicle 10A actually traveled on road surfaces. The position information 44a represents the position of the wheel 11 when the road surface displacement related value was obtained. The speed information 44b' represents the speed of the measurement vehicle 10A when the road surface displacement related value was obtained.

The preview reference data 43 may have a data structure other than the example data structure shown in FIG. 3.

Sixth Modification

The data processing section 45 may execute a process of estimating either or both of the time series data of the unsprung displacement $z_1$ and the time series data of the unsprung speed $dz_1$ on the basis of the sensing data by using an observer.

Seventh Modification

The data processing section 45 may produce the time series data of the road surface displacement $z_0$ by executing the above-described BPF process on the time series data of the road surface displacement $z_0$ detected by the preview sensor 36. Furthermore, the data processing section 45 may produce the time series data of the road surface displacement speed $dz_0$ by executing a differential process and a BPF process on the time series data of the road surface displacement $z_0$. Accordingly, the preview reference data 43 may contain, as the road surface displacement related value, at least one of the road surface displacement $z_0$, the road surface displacement speed $dz_0$, the unsprung displacement $z_1$, and the unsprung speed $dz_1$.

Eighth Modification

The preview reference data 43 may be stored in the storage device 30a of the vehicle 10 instead of being stored in the storage device 42 of the cloud 40. The ECU 130 may have the function of the data processing section 45 of the server 41. The ECU 130 may create the preview reference data 43 in the storage device 30a by executing the process of the routine of FIG. 10. In a different example, the ECU 130 may receive the preview reference data 43 from other vehicles 10 and store the preview reference data 43 in the storage device 30a.

Ninth Modification

The ECU 30 may obtain the unsprung displacement $z_1$ from the preview reference data 43 as follows. First, the ECU 30 transmits the predicted passage position (pf1 or pr1) and the vehicle speed Vs to the server 41. The server 41 obtains the speed range 44b corresponding to the vehicle speed Vs. The server 41 obtains the unsprung displacement $z_1$ (44c) related to the speed range 44b corresponding to the vehicle speed Vs and the predicted passage position. The server 41 transmits the unsprung displacement $z_1$ (44c) to the ECU 30.

Tenth Modification

The suspensions 13FL to 13RR may be suspensions of any type so long as the suspensions allow vertical displacements of the wheels 11FL to 11RR in relation to the body 10a. Furthermore, the suspension springs 16FL to 16RR may be springs of any type such as compression coil springs, air springs, etc.

Eleventh Modification

In the above-described embodiment, the active actuator 17 is used as a control force generating apparatus. However, the control force generating apparatus is not limited thereto. Namely, the control force generating apparatus may be any actuator which can adjustably generate a control force in the vertical direction for damping the vibration of the sprung portion 51, on the basis of a control instruction containing the target control force.

Furthermore, the control force generating apparatus may be an active stabilizer apparatus (not shown). The active stabilizer apparatus includes a front wheel active stabilizer and a rear wheel active stabilizer. When the front wheel active stabilizer generates a control force (left front wheel control force) in the vertical direction between the sprung portion 51 and the unsprung portion 50 which correspond to the left front wheel 11FL, the front wheel active stabilizer generates a control force (right front wheel control force) in the direction opposite the left front wheel control force between the sprung portion 51 and the unsprung portion 50 which correspond to the right front wheel 11FR. Similarly, when the rear wheel active stabilizer generates a control force (left rear wheel control force) in the vertical direction between the sprung portion 51 and the unsprung portion 50 which correspond to the left rear wheel 11RL, the rear wheel active stabilizer generates a control force (right rear wheel control force) in the direction opposite the left rear wheel control force between the sprung portion 51 and the unsprung portion 50 which correspond to the right rear wheel 11RR. The structure of the above-described active stabilizer apparatus is well known and is incorporated into the specification of the present application by referring to Japanese Patent Application Laid-Open (kokai) No. 2009-96366. Notably, it is sufficient that the active stabilizer apparatus includes at least one of the front wheel active stabilizer and the rear wheel active stabilizer.

The control force generating apparatus may be an apparatus which generates the control force Fc in the vertical direction by utilizing the geometry of the suspensions 13FL to 13RR; specifically, by increasing and decreasing braking and driving forces applied to the wheels 11 of the vehicle 10. The structure of such an apparatus is well known and is incorporated into the specification of the present application by referring to Japanese Patent Application Laid-Open (kokai) No. 2016-107778, etc. The ECU 30 computes the braking and driving forces for generating the control force Fc corresponding to the target control force Fct by a well known method.

Such an apparatus includes a drive apparatus (for example, in-wheel motors) for applying drive forces to the wheels 11 and a braking apparatus for applying braking forces to the wheels 11. Notably, the drive apparatus may be a motor, an engine, or the like which applies drive forces to the front wheels, the rear wheels, or the four wheels. Furthermore, it is sufficient that the control force generating apparatus includes at least one of the drive apparatus and the braking apparatus.

Alternatively, the control force generating apparatus may be damping-force-variable type shock absorbers 15FL to 15RR. In this case, the ECU 30 controls the damping coefficients C of the shock absorbers 15FL to 15RR in such a manner that the damping forces of the shock absorbers 15FL to 15RR change by an amount corresponding to the target control force Fct.

What is claimed is:

1. A vibration damping control apparatus for a vehicle, the vibration damping control apparatus comprising:
 a speed obtainment section configured to obtain speed information corresponding to a speed of the vehicle;
 a control force generating apparatus configured to generate a control force in a vertical direction for damping vibration of a sprung portion of the vehicle, the control force being applied between a wheel and a portion of a body of the vehicle that corresponds to a position of the wheel; and
 a control unit configured to determine a predicted passage position that the wheel is predicted to pass after an elapse of a predetermined time from a present point in time, to obtain, from preview reference data of a measurement vehicle, as preview information, a road surface displacement related value relating to a displacement of a road surface in the vertical direction at the predicted passage position, and to execute preview vibration damping control for controlling the control force generating apparatus such that when the wheel passes the predicted passage position, the control force coincides with a target control force computed using the preview information,
 wherein, in the preview reference data, relationships are established among the road surface displacement related value obtained when the measurement vehicle actually traveled on the road surface, position information representing a position of a wheel of the measurement vehicle when the road surface displacement related value was obtained, and speed information representing a speed of the measurement vehicle when the road surface displacement related value was obtained or representing a speed range in which the speed of the measurement vehicle was contained, and
 wherein the control unit is configured to obtain, as the preview information, at least a first road surface displacement related value which is the road surface displacement related value related to the speed information corresponding to the speed of the vehicle.

2. The vibration damping control apparatus according to claim 1, wherein the control unit is configured to obtain, as the preview information, a second road surface displacement related value in addition to the first road surface displacement related value, the second road surface displacement related value being the road surface displacement related value related to other relevant speed information that does not correspond to the speed of the vehicle.

3. The vibration damping control apparatus according to claim 2, wherein the control unit is configured to determine whether or not a predetermined condition is satisfied, the predetermined condition being that the road surface displacement related value related to the speed information corresponding to the speed of the vehicle is present in the preview reference data, to obtain, as the preview information, the first road surface displacement related value when the predetermined condition is satisfied, and to obtain, as the preview information, the second road surface displacement related value when the predetermined condition is not satisfied.

4. The vibration damping control apparatus according to claim 3, wherein the control unit is configured to obtain, as the second road surface displacement related value,
 the road surface displacement related value related to the other relevant speed information that corresponds to a speed that is lower than the speed of the vehicle, and
 the road surface displacement related value related to the other relevant speed information that corresponds to a speed that is higher than the speed of the vehicle.

5. The vibration damping control apparatus according to claim 1, further comprising an information obtaining apparatus which obtains the road surface displacement related value while the vehicle is traveling, wherein the target control force includes a first target control force and a second target control force, the first target control force being computed using the preview information, and the second target control force including at least one of a feedback control force for damping vibration of the sprung portion of the vehicle and a control force computed using the road surface displacement related value obtained by the information obtaining apparatus and representing a displacement of the road surface ahead of the wheel of the vehicle, and wherein the control unit is configured to determine whether or not a predetermined condition is satisfied, the predetermined condition being that the road surface displacement related value related to the speed information corresponding to the speed of the vehicle is present in the preview reference data, and to change either or both of a gain for the first target control force and a gain for the second target control force in accordance with a result of the determination as to whether or not the predetermined condition is satisfied.

6. The vibration damping control apparatus according to claim 1, wherein the road surface displacement related value includes at least one of the road surface displacement representing the displacement of the road surface in the vertical direction, a road surface displacement speed representing a derivative value of the road surface displacement with respect to time, an unsprung displacement representing a displacement of an unsprung portion of the vehicle in the vertical direction, and an unsprung speed representing a derivative value of the unsprung displacement with respect to time.

7. A data management apparatus comprising:

a storage device for storing preview reference data of a measurement vehicle; and a data processing apparatus, wherein, in the preview reference data, relationships are established among a road surface displacement related value which is a piece of information obtained when the measurement vehicle actually traveled on a road surface and relating to a displacement of the road surface in the vertical direction, position information representing a position of a wheel of the measurement vehicle when the road surface displacement related value was obtained, and speed information representing a speed of the measurement vehicle when the road surface displacement related value was obtained or representing a speed range in which the speed of the measurement vehicle was contained, and wherein the data processing apparatus is configured to supply the preview reference data to a vehicle in response to a request from the vehicle when the vehicle executes preview vibration damping control.

* * * * *